US012597651B2

(12) United States Patent
Sonoc et al.

(10) Patent No.: US 12,597,651 B2
(45) Date of Patent: Apr. 7, 2026

(54) HYDROMETALLURGICAL RECYCLING OF LITHIUM-ION BATTERY ELECTRODES

(71) Applicant: Queen's University at Kingston, Kingston (CA)

(72) Inventors: Alexandru Sonoc, Kingston (CA); Jacob Jeswiet, Kingston (CA); Ahmad Ghahreman, Kingston (CA)

(73) Assignee: Queen's University at Kingston, Kingston (CA)

( * ) Notice: Subject to any disclaimer, the term of this patent is extended or adjusted under 35 U.S.C. 154(b) by 794 days.

(21) Appl. No.: 17/925,149

(22) PCT Filed: May 14, 2021

(86) PCT No.: PCT/CA2021/050663
§ 371 (c)(1),
(2) Date: Nov. 14, 2022

(87) PCT Pub. No.: WO2021/226719
PCT Pub. Date: Nov. 18, 2021

(65) Prior Publication Data
US 2023/0187720 A1     Jun. 15, 2023

Related U.S. Application Data

(60) Provisional application No. 63/025,913, filed on May 15, 2020.

(51) Int. Cl.
*H01M 10/00* (2006.01)
*C22B 3/16* (2006.01)
(Continued)

(52) U.S. Cl.
CPC ............. *H01M 10/54* (2013.01); *C22B 3/165* (2013.01); *C22B 3/22* (2013.01); *C22B 7/007* (2013.01);
(Continued)

(58) Field of Classification Search
CPC .. H01M 10/54; H01M 4/525; H01M 10/0525; Y02W 30/84
See application file for complete search history.

(56) References Cited

FOREIGN PATENT DOCUMENTS

| CN | 106997972 A | * | 8/2017 | ............ H01M 10/54 |
|---|---|---|---|---|
| CN | 110817910 A | | 2/2020 | |
| KR | 10-2137174 B1 | | 7/2020 | |

OTHER PUBLICATIONS

Wang, A High-efficiency Separation of Anodal Material of Waste Lithium Ion Battery Metal Fluid Collecting Method, Aug. 2017, See the Abstract. (Year: 2017).*

(Continued)

*Primary Examiner* — Tiffany Legette
*Assistant Examiner* — Monique M Wills
(74) *Attorney, Agent, or Firm* — Stephen J. Scribner

(57) ABSTRACT

A green chemistry hydrometallurgical process for recovering one or more metals from a metal-containing material includes leaching the metal-containing material with formic acid, obtaining a leachate comprising the one or more metals as one or more metal formates, and precipitating at least one of the one or more metal formates. The metal-containing material may be a lithium-ion battery cathode material, resulting in Li formate remaining in solution and precipitation of salts including one or more of Ni, Co, and Mn formates. Steps may include filtration of the leachate, sulphurization of retained metal formate salts to produce metal sulphate salts, purification of filtered leachate by adding lithium carbonate and filtering, dewatering of the purified leachate, and thermal decomposition of resulting lithium salts to produce battery grade lithium carbonate. Carbon dioxide, water, and formic acid may be recovered and reused, without liquid or solid waste produced.

18 Claims, 7 Drawing Sheets

(51) Int. Cl.

| | |
|---|---|
| *C22B 3/22* | (2006.01) |
| *C22B 7/00* | (2006.01) |
| *H01M 4/505* | (2010.01) |
| *H01M 4/525* | (2010.01) |
| *H01M 10/0525* | (2010.01) |
| *H01M 10/54* | (2006.01) |

(52) U.S. Cl.
CPC ........... *H01M 4/505* (2013.01); *H01M 4/525* (2013.01); *H01M 10/0525* (2013.01)

(56) References Cited

OTHER PUBLICATIONS

International Search Report and Written Opinion for Corresponding International Application No. PCT/CA2021/050663 filed on May 14, 2021.

Gao, W., et al., "Lithium Carbonate Recovery from Cathode Scrap of Spent Lithium-Ion Battery: A Closed-Loop Process", Environ. Sci. Technol. vol. 51, pp. 1662-1669, (2017).

Marins, A.A. et al, "Synthesis of Ni and rare earth metal (La, Pr, and Nd) oxides from spent Ni-MH batteries by selective precipitation with formic acid an investigation of photoluminescence properties", Ionics, vol. 26, pp. 311-321, (2019).

Zheng, Y., et al., "Lithium fluoride recovery from cathode material of spent lithium-ion battery", RSC Adv., vol. 8, pp. 8990-8996, (2018).

Chagnes, A., et al. "A brief review on hydrometallurgical technologies for recycling spent lithium-ion batteries", J. Chem. Technol. Biotechnol. 88, pp. 1191-1199, (2013).

Diekmann, J., et al., "Ecologically Friendly Recycling of Lithium-Ion Batteries—the LithoRec Process", ECS Trans. 73, pp. 1-9, (2016).

Dollimore, D., et al., "The thermal decomposition of zinc and manganous formates", J. Inorg. Nucl. Chem. 29, pp. 621-627, (1967).

Gao, W., et al., "Comprehensive evaluation on effective leaching of critical metals from spent lithium-ion batteries", Waste Manag. 75, pp. 477-485, (2018).

Golomohammadzadeh, R., et al., "Recovery of lithium and cobalt from spent lithium ion batteries (LIBs) using organic acids as leaching reagents: A review", Resour. Conserv. Recycl. 136, pp. 418-435, (2018).

Hanisch, C , et al., "Recycling of lithium-ion batteries: a novel method to separate coating and foil of electrodes", J. Clean. Prod. 108, pp. 301-311, (2015).

Huang, B., et al., "Recycling of lithium-ion batteries: Recent advances and perspectives", J. Power Sources 399, pp. 274-286, (2018).

Ly, W., et al , "A Critical Review and Analysis on the Recycling of Spent Lithium-Ion Batteries", ACS Sustain. Chem. Eng. 6, pp. 1504-1521, (2018).

Meshram, P., et al., "Hydrometallurgical processing of spent lithium ion batteries (LIBs) in the presence of a reducing agent with emphasis on kinetics of leaching", Chem. Eng. J. 281, pp. 418-427, (2015).

Meshram, P., et al., "Recovery of valuable metals from cathodic active material of spent lithium ion batteries: Leaching and kinetic aspects", Waste Manag. 45, pp. 306-313, (2015).

Nayl, A.A., et al., "Selective extraction and separation of metal values from leach liquor of mixed spent Li-ion batteries", J. Taiwan Inst. Chem. Eng. 55, pp. 119-125, (2015).

Sonoc, A., et al., "Opportunities to Improve Recycling of Automotive Lithium Ion Batteries", Procedia CIRP 29, pp. 752-757, (2015).

Zhang, P., et al., "Hydrometallurgical process for recovery of metal values from spent lithium-ion secondary batteries", Hydrometallurgy 47, pp. 259-271, (1998).

Zheng, X., et al., Green Industrial Processes—Review a Mini-Review on Metal Recycling from Spent Lithium Ion Batteries 4, pp. 361-370, (2018).

* cited by examiner

Li (■), Mn (●), Co (▲), Ni (◆) in Figs. 9A to 9C

Gas production (■) and pH (●) in Figs. 9D to 9F

HYDROMETALLURGICAL RECYCLING OF LITHIUM-ION BATTERY ELECTRODES

FIELD

The invention relates generally to a hydrometallurgical process for recovering one or more metals from a metal-containing material. More specifically, the invention relates to methods for recycling lithium-ion battery (LIB) cathode active material. The methods relate to the field of green chemistry, as by-products including carbon dioxide, formic acid, and water may be captured and reused, such that no liquid or solid waste is produced.

BACKGROUND

Due to their high power and energy densities, lithium-ion batteries (LIBs) are the most widely used battery type in personal electronics, power tools, and electric/hybrid vehicles (EVs). LIBs with cathode active material based on mixtures of nickel, cobalt, and manganese (NCM) oxides, such as $Li_3NiCoMnO_6$ (NCM111), are widely used in EVs. The metals used to make active material for LIB cathodes are a significant cost in the manufacture of LIBs. Thus, recycling LIBs once they have reached their end-of-life and using the recovered materials to make new batteries presents enormous economic opportunity (400,000 tonnes containing materials worth 2.6 billion USD are predicted to be available for recycling in 2025 (Melin, 2018)). Besides economic benefits, making batteries out of recycled materials rather than virgin materials, as much as possible, has additional benefits: fewer emissions of green house gases and sulfur dioxide, decreased energy usage, moderation of prices of virgin materials, and a reduction in reliance on imported raw materials.

Two general approaches for recycling LIBs are available: pyrometallurgy and hydrometallurgy methods. Hydrometallurgical processes are generally preferred because they operate at lower temperatures, use less energy, do not require large scale to be economically efficient (which enables local recycling), and, most importantly, hydrometallurgical processes recover lithium, while pyrometallurgical ones do not.

There are four steps in hydrometallurgical recycling of LIBs. The first is deactivating the batteries to prevent fires. Two methods used for example are discharging to 0.0 V and opening the batteries in an inert atmosphere, such as carbon dioxide (Hanisch et al., 2015; Sonoc et al., 2015). The second step is shredding the batteries and separating the components (cathode and anode powders, aluminium and copper current collectors, casing, separator, electrolyte salts and solvents). Separation is often by mechanical means but heat and/or solvents are also occasionally used to liberate the cathode powder from the aluminium current collectors (Chagnes and Pospiech, 2013; Zheng et al., 2018a; Zheng et al., 2018b). Some methods are very efficient at isolating cathode powder, for example the LithoRec-Process achieves 97% recovery of cathode powder with contamination of copper and aluminium of only 1.8 and 0.1 wt % respectively (Diekmann et al., 2016; Hanisch et al., 2015).

The third step is leaching of the cathode powder fraction which was isolated in the previous step. Leaching is often done with acids in a reducing environment since the soluble forms of Ni, Co, and Mn are as +2 ions while their valances in NCM are +2, +3, and +4 (Gao et al., 2017; Meshram et al., 2015a, 2015b). Leaching efficiencies of up to 100% have been reported with both inorganic and organic acids, typically with $H_2O_2$ added as a reducing agent (Chagnes and Pospiech, 2013; Gao et al., 2017; Gao et al., 2018; Lv et al., 2018; X. Zheng et al., 2018a; Zheng et al., 2018b). Using formic acid with added $H_2O_2$ leaching efficiencies of up to 99.93, 93.81, 90.49, 88.66% for Li, Ni, Co, and Mn, respectively, have been reported (Gao et al., 2017). Organic acids have many advantages over inorganic acids and, despite their higher purchase price, are gaining acceptance in developing green chemistry leaching processes. Organic acids produce non-toxic biodegradable wastewater and are less corrosive to equipment (Golmohammadzadeh et al., 2018).

The fourth and final step is the recovery of metals from the pregnant leach solution (PLS). Solvent extraction is used to recover Ni, Co, Mn as separate salts (Chagnes and Pospiech, 2013; Huang et al., 2018; Lv et al., 2018; Nayl et al., 2015). Lithium is recovered by concentrating the residual PLS, then heating it to nearly 100° C., and finally saturating it with sodium carbonate, which precipitates lithium carbonate (Meshram et al., 2015a; Zhang et al., 1998). Though chemical precipitation of lithium is attractive because of low cost and low energy consumption, inevitably a waste product of sodium and lixiviant anion is made, which complicates both separation of the desired product and recyclability of the solution (Huang et al., 2018).

SUMMARY

According to one aspect of the invention there is provided a method for recovering one or more metals from a metal-containing material, comprising leaching the metal-containing material with formic acid; obtaining a leachate solution comprising the one or more metals as one or more metal formates; and precipitating at least one of the one or more metal formates.

In one embodiment the metal-containing material comprises a battery electrode. In one embodiment the battery electrode comprises a lithium-ion battery cathode. In one embodiment the lithium-ion battery cathode includes cathode active material comprising at least one of NCM, LCO, NCA, MO, and NMO. In one embodiment the cathode active material comprises NCM. In one embodiment the cathode active material comprises NCM111.

In one embodiment the method comprises precipitating one or more of Ni, Co, and Mn formates; and obtaining a Li formate solution.

In one embodiment the metal-containing material is in a physical form selected from at least one of shredded, particulate, and powdered.

In one embodiment the formic acid has a concentration up to about 50% v/v.

In one embodiment the formic acid has a concentration up to about 80% v/v.

In one embodiment leaching is done at atmospheric pressure and at a temperature up to about 95° C.

In one embodiment leaching is done at an elevated pressure up to about 45 bar at a temperature up to about 270° C.

In one embodiment at least about 0.1 g of formic acid are used to leach each gram of metal-containing material.

In one embodiment the method comprises subjecting the Li formate solution to one or more steps of solid/liquid separation.

In one embodiment the method comprises adding lithium carbonate to the Li formate solution after solid/liquid separation to precipitate one or more of residual Ni, Co, and Mn ions in solution.

In one embodiment the method comprises saturating the Li formate solution with Li carbonate.

In one embodiment the method comprises recovering carbon dioxide produced during the leaching.

According to another aspect of the invention there is provided a method for recovering Li from a Li formate solution, comprising filtering and dewatering the Li formate solution to produce Li formate salts; and subjecting the Li formate salts to thermal decomposition at a temperature of about 270 to about 450° C.; wherein Li carbonate is obtained.

In one embodiment the method comprises subjecting the Li formate salts to thermal decomposition under atmospheric conditions that reduce, suppress, or eliminate carbon formation.

In one embodiment the atmospheric conditions that reduce, suppress, or eliminate carbon formation include one or more of air, oxygen, and carbon dioxide.

In one embodiment the method comprises adding Li carbonate to the Li formate solution.

In one embodiment the method comprises subjecting Li formate solution to one or more steps of solid/liquid separation prior to adding the Li carbonate.

In one embodiment the method comprises subjecting the Li salts to thermal decomposition at a temperature up to about 450° C.

In one embodiment the Li formate solution is produced by leaching lithium-ion battery cathode active material with formic acid.

In one embodiment the method comprises saturating the Li formate solution with Li carbonate.

In one embodiment the obtained Li carbonate has a purity suitable for use in lithium-ion battery cathode active material.

In one embodiment the obtained Li carbonate has a purity up to about 99.99% wt.

According to another aspect of the invention there is provided a method for recovering one or more of Ni, Co, and Mn from one or more of Ni, Co, and Mn formate salts, comprising reacting the one or more of Ni, Co, and Mn formate salts with sulphuric acid to produce one or more of Ni, Co, and Mn sulphates and formic acid; and subjecting the one or more of Ni, Co, and Mn sulphates and formic acid to crystallization and dewatering to produce one or more of crystallized Ni, Co, and Mn sulphates.

In one embodiment the one or more of Ni, Co, and Mn formate salts are produced by leaching lithium-ion battery cathode active material with formic acid.

In one embodiment the method comprises recovering water and the formic acid.

According to another aspect of the invention there is provided a method for recovering metals from lithium-ion battery cathode active material, comprising leaching the cathode active material with formic acid; precipitating metal salts including one or more of Ni, Co, and Mn formate salts; obtaining a Li formate solution; filtering and dewatering the Li formate solution to produce an Li salt; subjecting the Li salt to thermal decomposition at a temperature of about 270 to about 450° C.; wherein Li carbonate is obtained; and reacting the one or more of No, Co, and Mn formate salts with sulphuric acid to produce one or more of Ni, Co, and Mn sulphates and formic acid; subjecting the one or more of Ni, Co, and Mn sulphates to dewatering and crystallization to produce one or more of crystallized Ni, Co, and Mn sulphates.

In one embodiment the method comprises adding lithium carbonate to the Li formate solution prior to thermal decomposition to precipitate one or more of residual Ni, Co, and Mn formate salts.

In one embodiment the method comprises filtering the Li formate solution, adding lithium carbonate to precipitate one or more of residual Ni, Co, and Mn formate salts, and then filtering the Li formate solution prior to thermal decomposition.

In one embodiment the obtained Li carbonate has a purity suitable for use in lithium-ion battery cathode active material.

In one embodiment the lithium-ion battery cathode active material comprises at least one of NCM, LCO, NCA, MO, and NMO. In one embodiment the cathode active material comprises NCM. In one embodiment, the cathode active material comprises NCM111.

In one embodiment the lithium-ion battery cathode active material is present in a starting material prepared from a lithium-ion battery that has been subject to physical degradation selected from at least one of shredding, grinding, and pulverizing.

In one embodiment the Ni, Co, and Mn sulphates are subject to filtration and/or recrystallization prior to or after dewatering to remove low solubility contaminants.

In one embodiment the cathode active material is isolated from other components in the starting material.

In one embodiment the method comprises recovering carbon dioxide produced during the leaching. In one embodiment the method comprises using the covered carbon dioxide to create an atmosphere suitable for disassembling a lithium-ion battery without adverse reaction.

In one embodiment the method comprises recovering water and formic acid produced during dewatering and crystallization.

In one embodiment the method comprises using the recovered formic acid for leaching the battery cathode active material.

In one embodiment the method comprises using the covered carbon dioxide to create an atmosphere suitable for disassembling a lithium-ion battery without adverse reaction.

According to another aspect of the invention there is provided a method for recovering one or more of nickel, cobalt, manganese, aluminium, and copper from a sulphate solution, comprising adding a formate compound to the sulphate solution; wherein the one or more of nickel, cobalt, manganese, aluminium, and copper are precipitated as formate salts; and filtering the precipitated formate salts from the solution.

In one embodiment the sulphate solution after adding the formate compound is of pH greater than about 1 and less than about 10.

In one embodiment the formate compound comprises at least one of lithium formate, sodium formate, potassium formate, calcium formate, barium formate, ammonium formate, cesium formate, rubidium formate, magnesium formate, and pure or diluted formic acid.

In one embodiment the method comprises using formic acid as the formate compound; and adding a neutralizing agent to the sulphate solution to maintain the pH to be greater than about 1 and less than about 10.

BRIEF DESCRIPTION OF THE DRAWINGS

For a better understanding of the invention, and to show more clearly how it may be carried into effect, embodiments will be described below, by way of example, with reference to the accompanying drawings, wherein.

DETAILED DESCRIPTION OF EMBODIMENTS

Figure 1:
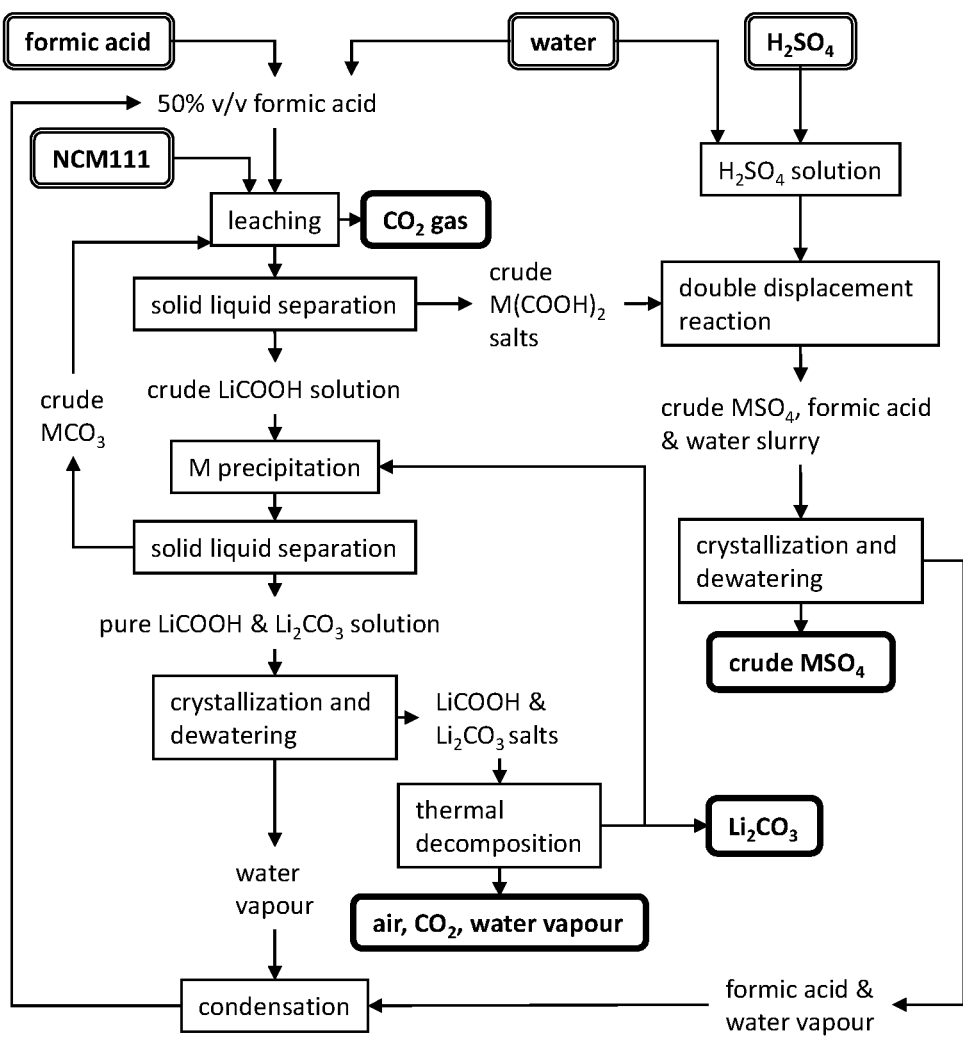
FIG. 1 is a block diagram showing an NCM 111 recycling process wherein rounded rectangles with double-line and solid borders represent input and output species, respectively; square rectangles represent processes; and captions without rectangles represent intermediary species; "M" in a species name refers to metal, e.g., Ni, Co, and Mn, according to one embodiment.
Figures 2A, 2B, 2C, 3A, 3B, 3C:
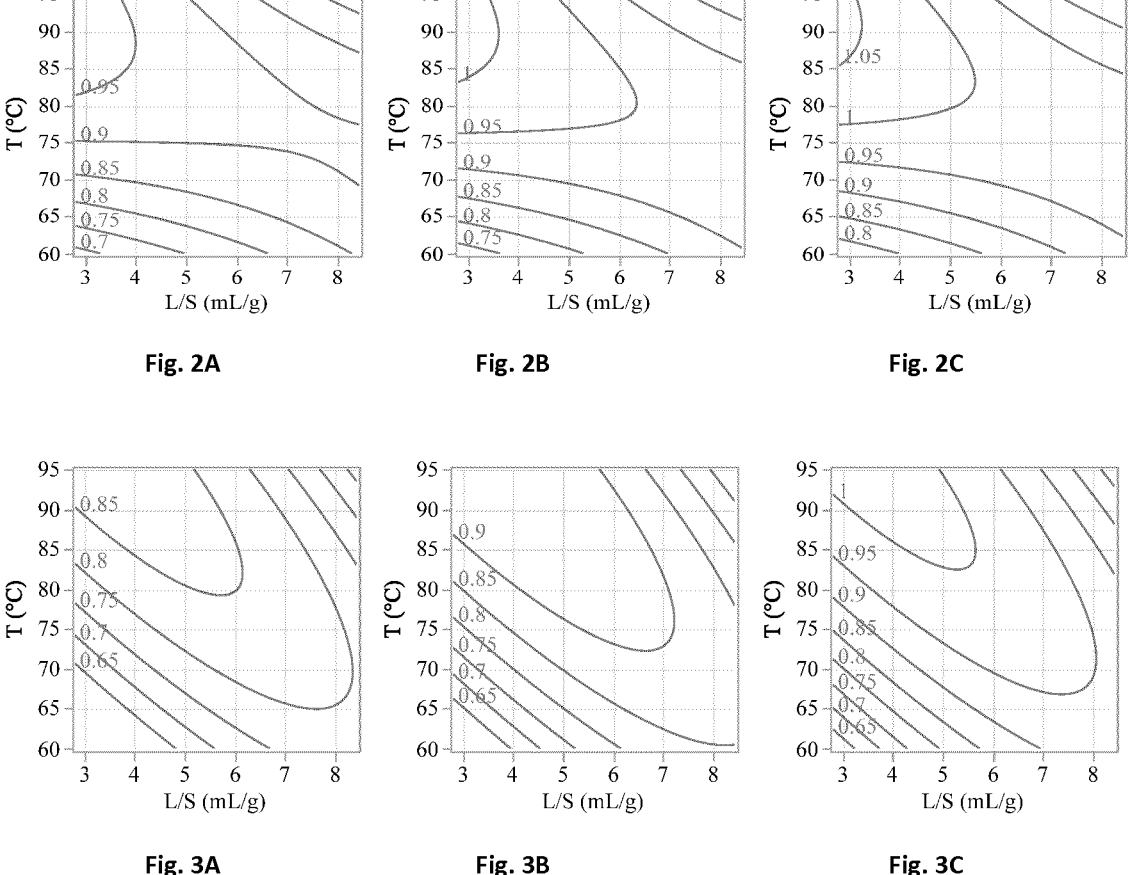
FIGS. 2A-2C are predicted Li leaching efficiency (fLi') contour plots at 6.4, 15, and 35.5 hours, respectively.
FIGS. 3A-3C are predicted Co, Ni, and Mn leaching efficiency (fA') contour plots at 6.4, 15, and 35.5 hours, respectively.

According to a broad aspect of the invention, there is provided a hydrometallurgical process for recovering one or more metals from a metal-containing material. Embodiments include recovering metal formates $M(COOH)_2$ as precipitates from leachates produced by leaching metal-containing material with formic acid (HCOOH). The metal-containing material may be battery electrodes, although the methods are not limited to such materials. Some embodiments are directed to methods for recovering metals from lithium-containing battery electrodes, and particularly from lithium-ion battery cathodes, wherein separate routes are provided for recovering lithium formate and for recovering other metal formates.

As used herein, the term "cathode active material" refers to a chemical compound in a battery that is reduced when the battery is discharged. The battery may be, for example, a lithium-ion battery. The active material may be one or more metal selected from, but not limited to, lithium, nickel, cobalt, manganese, and aluminum, and oxides thereof.

Embodiments are based on leaching metal-containing material, such as cathode active material, with formic acid, which is advantageously used to form formate salts with metals including, for example, lithium, nickel, cobalt, and manganese. Due to large differences in solubility between the formate salts, and under appropriate conditions as described herein, leaching results in separation between metals such as lithium formate, which remain in the solution, and other metals such as nickel, cobalt, and manganese formate salts, which largely precipitate after they are leached.

Thus, certain embodiments are directed towards recovering one or more of lithium, cobalt, nickel, and manganese. In general, there are two recovered products, one based on lithium and the other based on one or more of cobalt, nickel, and manganese. Embodiments may be applied to lithium-ion battery cathode active materials including layered structure compounds such as, for example, NCM (oxide of Li, Ni, Co, and Mn), LCO (oxide of Li and Co), NCA (oxide of Li, Ni, Co, and Al), and including compounds such as MO (oxide of Li and Mn) and NMO (oxide of Li, Ni, and Mn). In LIBs, for example, cathode active material may be of the form $LiMO_2$ where M is Ni, Co, or Mn, or any combination thereof, for which embodiments described herein may be used, or the principles applied, to recover metals, particularly Co, Ni, and Mn. Examples of layered structure compounds include, but are not limited to, $LiCoO_2$, $Li_3NiCoMnO_6$ (which may be referred to as NCM111 because nickel, cobalt, and Mn are in a 1:1:1 ratio), NCM811, and NCM523.

Cathode active material of type NCA are also of the form $LiMO_2$, but they contain aluminum, for example, LiNi-CoAlO2 (Ni:Co:Al=8.15:1.5:0.35). The small amount of aluminum together with the low solubility of aluminum formate contributes to effective leaching and effective separation of Ni, Co, and Al from Li.

Cathode active material types MO and NMO are also rich in manganese of the form $LM_xMn_{2-x}\ O_2$, and include spinel composites such as $LiMn_2O_4$ and $LiNi_{0.5}Mn_{1.5}O_4$. It is expected that the principles and processes described herein applied to these materials will result in leaching of the Li, Ni, and Mn and separation of Mn and Ni from Li.

In general, LIB cathodes are made by mixing cathode active material, typically in the form of a powder, with other materials such as graphite and a binder, and pressing it onto an aluminum foil. LIB anodes are made by mixing graphite and binder and pressing them onto a copper foil. A plastic separator is placed between the electrodes and then an electrolyte is added and the battery is sealed in a casing. Solid state and gel electrolyte LIBs have been proposed.

The starting material for methods for recovering metals from battery electrodes, according to embodiments, may be electrodes that have been shredded, ground, etc., so that they are in a particulate form. Some LIB shredding processes isolate cathode powder, some processes provide the cathode powder as a mixture of cathode active material (e.g., NCM), graphite, and binder, some processes remove the binder, some processes isolate cathodes (so there is still aluminum present), some processes isolate cathodes and anodes, and some processes shred the whole battery such that casing, separator, anode and cathode are all present. Thus, shredded battery electrodes can include diverse constituents, for example, carbon may be mechanically integrated with cathode active material, such that physical separation of the two is difficult. However, leaching of the metals may be accomplished according to the principles and embodiments described herein. When Co, Ni, and Mn are leached and precipitated as formates they are liberated from carbon and easily separated.

Preliminary experiments were conducted with whole shredded battery material (batteries obtained from Tesla, Inc.). The shredded material included plastic, aluminium, and copper, with some copper and aluminium oxidized. Results are shown in Table 1. In Experiments BAT1 and BAT2 the batteries were prepared as circular shreds, about 1 cm in diameter and 1 mm in thickness. In Experiment BAT3, the shreds were ground with a coffee grinder into fine particles (<1 mm).

obtained from LIB cathodes. As noted above, embodiments are based on leaching with formic acid. Formic acid is both a mildly strong organic acid, pKa 3.75, and a reducing agent, $E°=-0.199$ V. The leaching reaction produces formate salts, as shown in Equation 1 (Gao et al., 2017). LiCOOH has high solubility, 7.43 mol/kg water at 18° C. $Ni(COOH)_2$, $Co(COOH)_2$, and $Mn(COOH)_2$, however, have low solubilities: 0.137, 0.161, and 0.452 mol/kg water, respectively, at 20° C. as pure components and, based on binary solubility data, roughly a third of these values when all three are present (International Union of Pure and Applied Chemistry, 2012). Thus, based on solubility data, leaching NCM111 with formic acid, especially at low liquid to solid ratios, results in separation between lithium, which remains in the solution, and nickel, cobalt, and manganese, which largely precipitate after they are leached.

$$2Li_3NiCoMnO_{6(s)}+21HCOOH_{(aq)} \rightarrow 6LiCOOH_{(aq)}+ \\ 2Ni(COOH)_{2(aq)}+2Co(COOH)_{2(aq)}+2Mn \\ (COOH)_{2(aq)}+3CO_{2(g)}+12H_2O_{(l)} \qquad \text{(Equation 1)}$$

TABLE 1

Results of leaching experiments with whole shredded lithium-ion batteries.

| Exp. | Liquid/ Solid (mL/g) | Solution volume (mL) | T (° C.) | Time (h) | Powder weight (g) | Conversions | | | | | |
|------|------|------|------|------|------|------|------|------|------|------|------|
| | | | | | | Co | Li | Mn | Ni | Al | Cu |
| BAT1 | 7.2867 | 50 | 67.1 | 25 | 6.8618 | 92% | 98% | 92% | 91% | 87% | 7% |
| BAT2 | 5.6254 | 50 | 77.5 | 25 | 8.8883 | 83% | 92% | 85% | 83% | 64% | 3% |
| BAT3 | 2.7154 | 25 | 67.1 | 25 | 9.2067 | 96% | 104% | 95% | 97% | 0% | 8% |

As can be seen, there was substantial leaching of the desired metals (Li, Co, Mn, Ni). Leaching of copper and aluminium is not desired since they are contaminants. Very little copper was leached in all three of the experiments. This suggests that including anodes in the starting material would not be problematic, there would simply be more insoluble material to filter out from the sulphates. The aluminum results are mixed and suggest that either a fine powder or a low L/S ratio favours low aluminum leaching.

Although the above results demonstrate that leaching as described herein is effective when anodes and non-active cathode material (aluminium current collector, carbon, binder) are included in the starting material, better results may be achieved when cathode active material is isolated. In general, results from LIBs demonstrate that with more cathode active material present per mL of formic acid solution, better leaching will be achieved and better separation of Co, Ni, and Mn from Li will result. Adding diluent (i.e., contaminants) as are present in anodes and non-active cathode material reduces the amount of cathode active material that can be processed because there is a limit to how much solids can be added to a solution and proper conditions maintained. In other words, with less cathode active material per mL of formic acid, leaching progresses at suboptimal conditions and thus longer leaching times and reduced separation efficiency of Co/Ni/Mn from Li results. Thus, whereas ideally the starting material for leaching is isolated cathode active material, it will be appreciated that the starting material does not need to be pure for the process to work, as the above results (Table 1) demonstrate leaching of desired metals proceeds well even in the presence of contaminants.

Embodiments will be further described with respect to NCM. An exemplary material is NCM111, which may be As a non-limiting example, leaching of NCM111 may be carried out with 50% v/v formic acid for 30 hours at $L/S_{initial}=2.81$ mL/g and T=95° C. Under these conditions almost 100% of Li, Ni, Co, and Mn are leached, with about 95% of Ni, Co, and Mn and none of the Li precipitated during leaching. Leaching NCM111 with formic acid produces carbon dioxide, which may be used to deactivate LIBs and/or used as feedstock to remake formic acid.

Thus, according to embodiments, a substantial portion of one or more metal formates produced during leaching with formic acid spontaneously precipitates, because of their low solubility, provided that the one or more metal formate is any metal formate other than lithium formate, sodium formate, potassium formate, ammonium formate, cesium formate, rubidium formate, or magnesium formate, as these are highly soluble.

Further embodiments may include processing to recover the Ni, Co, and Mn that remain in solution after it is filtered. For example, residual Ni, Co, and Mn may be precipitated by adding lithium carbonate. In one embodiment the method includes saturating the filtered solution with lithium carbonate. In one embodiment, lithium carbonate is added, resulting in further precipitation (e.g., 4.5% precipitated when the solution temperature was about 95° C.). Cooling the solution, although energy intensive, may further increase precipitation, resulting in greater purity of Li in the remaining solution). Thus, a total of about 99.5% of the Ni, Co, and Mn may be precipitated.

In further embodiments, Ni, Co, and Mn formates, filtered out of the solution, may be reacted with sulphuric acid to produce a high yield of mixed sulphates $NiSO_4$, $CoSO_4$, $MnSO_4$ (e.g., >99%, such as 99.5%), which may be used in LIB manufacturing, and formic acid, which may be recovered and used for leaching. Equation 2 is an overall reaction encompassing dissolution of formate salts, double displacement with sulphuric acid, and crystallisation of hydrated sulphate salts according to an embodiment in which the reaction occurs in water. The number of water molecules for each hydrated is assumed to be the same as typically observed in sulphate crystallisation studies.

$$Co(COOH)_2 \cdot 2H_2O_{(s)} + Ni(COOH)_2 \cdot 2H_2O_{(s)} + Mn(COOH)_2 \cdot 2H_2O_{(s)} + 3H_2SO_{4(aq)} + 8H_2O \rightarrow NiSO_4 \cdot 6H_2O_{(s)} + CoSO_4 \cdot 7H_2O_{(s)} + MnSO_4 \cdot H_2O_{(s)} + 6HCOOH_{(aq)}$$ (Equation 2)

In other embodiments process conditions may be varied, for example, to produce sulfates with more molecular water, less molecular water, or anhydrate sulfates with no water.

In further embodiments that include recovering lithium, a lithium formate intermediary may be produced by removing water from the solution. The lithium formate may then be thermally decomposed in air at, e.g., 280-450° C., to produce a highly pure (e.g., >99 wt %, such as 99.97 wt %) lithium carbonate product (see Equation 3), thus providing a sodium-free way to obtain lithium carbonate. Dewatering and thermal decomposition may be carried out in separate apparatuses, or together, such as in a spray drier, spray pyrolyzer, flame spray pyrolyzer, or furnace.

$$2LiCOOH_{(s)} + O_{2(g)} \rightarrow Li_2CO_{3(s)} + CO_{2(g)} + H_2O_{(g)}$$ (Equation 3)

Embodiments described herein are different from previous approaches to LIB recycling using formic acid (Gao et al., 2017; Zheng et al., 2018b) in at least four aspects. First, in the previous studies leaching and precipitation were not individually investigated: only measurements of dissolved metals were made and leaching efficiency was calculated by dividing amounts of dissolved metals by amounts initially present in the LIB materials. In the embodiments, leaching and precipitation were investigated separately: total amounts of metals leached were measured and used to calculate leaching efficiency (see Equation 4 below). Precipitation of $Ni(COOH)_2$, $Co(COOH)_2$, and $Mn(COOH)_2$ salts was investigated through solubility measurements.

Thus, whereas previous approaches measured only dissolved metals concentrations and were focussed on maximizing the ratio of amount dissolved to amount in initial feed for each of Li, Ni, Co, and Mn, in the embodiments leaching and precipitation are addressed separately and each is optimized independently. With this approach, percentages of Li, Ni, Co, and Mn leached from the feed stock and percentages of Ni, Co, Mn precipitated as formats are maximized. The higher percentages of metals leached provides more effective leaching. The higher percentages of Ni, Co, and Mn formates precipitated provides better separation between Li, which does not precipitate, and Ni, Co, and Mn. As described herein, percentages of materials leached were found by measuring total amounts of metals leached rather than dissolved metals content, and percentages of materials precipitated were found through solubility measurements. Overall, the embodiments provide significant improvements in metal recovery from lithium-containing battery electrodes over prior approaches. Also, since embodiments may be implemented in a closed-loop process that produces neither liquid nor solid waste, they are more environmentally friendly than prior approaches.

Second, in the previous studies hydrogen peroxide was added to accelerate leaching. In the embodiments hydrogen peroxide is not used because it decomposes above 60° C. and releases oxygen gas when it reacts, which, unlike the $CO_2$ released when formic acid is used alone, cannot be used to deactivate LIBs.

Third, in the embodiments optimum leaching conditions are determined using a multi-factor analysis of amounts of metals (dissolved and precipitated) leached with statistical modelling, considering industrially relevant conditions. For example, total amounts of Li, Ni, Co, and Mn (dissolved and precipitated) leached were measured, and statistical modelling results from response surface methodology (RSM) experiments were developed to predict leaching efficiency at industrially relevant conditions, and the models were used to maximize efficiency. For example, such models were used to generate the contour plots of FIGS. 2A-2C and 3A-3C, which show regions with highest leaching efficiencies. Based on the models, leaching time was incrementally shortened until the contour plots showed a small region with leaching efficiency of 100% (e.g., T+/−0.5° C. and L/S+/−0.1 mL/g). Since Li and Mn/Ni/Co have different optimums a set of conditions able to achieve 100% leaching efficiency for all four metals was selected as the overall optimum. In order to create the statistical models, experiments where more than one factor at a time is varied, in a manner described by response surface methodology, were conducted. In contrast, the prior methods were based on studies where only a single factor was varied at a time, which cannot be used to generate a model and optimize overall leaching efficiency for multiple metals simultaneously.

Lastly, in the embodiments lithium carbonate is recovered by thermal decomposition of lithium formate, which is a sodium-free method that has never before been proposed in the LIB recycling literature. In contrast, in the prior approaches lithium carbonate is recovered by chemical precipitation with sodium carbonate, which creates sodium contamination.

The invention will be further described by way of the following non-limiting Working Examples.

Working Example 1

1. Process and Methodology

FIG. 1 shows an embodiment of an NCM recycling process used to obtain the results reported herein. Referring to FIG. 1, a 50% v/v formic acid solution was used to leach NCM111 cathode active material. Leaching produces a solution rich in LiCOOH, precipitated salts of $Co(COOH)_2$, $Ni(COOH)_2$, $Mn(COOH)_2$, and carbon dioxide gas. The PLS (pregnant leach solution) is purified by solid/liquid separation, addition of lithium carbonate (which precipitates residual Ni, Co, and Mn), and another solid/liquid separation. The high purity lithium solution obtained is evaporated, which crystallizes lithium formate. The lithium formate is thermally decomposed to lithium carbonate. The solids from the second solid/liquid separation are added back to the leaching reactor. The water vapours obtained from the evaporation step are condensed and recycled.

Crude $Ni(COOH)_2$, $Co(COOH)_2$, $Mn(COOH)_2$ salts obtained after leaching are reacted with a solution of sulphuric acid. The slurry obtained is evaporated yielding crude $NiSO_4 \cdot 6H_2O$, $CoSO_4 \cdot 7H_2O_{(s)}$, $MnSO_4 \cdot H_2O$ salts, and formic acid/water vapour. The vapour is condensed, adjusted with pure formic acid and water, and reused as lixiviant without further purification. The formic acid recovered and reused as lixiviant may provide up to 57% of the formic acid required. The salts may be purified and/or separated into battery grade salts. Since the stoichiometry of Equations 1 and 2 predicts that water is consumed by the process, rather than produced, and since the recovered lixiviant is of high enough purity to be fully recycled, the process theoretically achieves zero liquid discharge. The water reclaimed in the two recovery steps described above may provide up to 66% of the water need for lixiviant. Furthermore, as can be seen in FIG. 1, the process produces little or no solid waste.

Detailed investigations were carried out for the leaching step primarily through RSM experiments in which the total amounts of Li, Ni, Co, and Mn (dissolved and precipitated) leached were measured. Statistical models to predict leaching efficiency at industrially relevant conditions were developed, and the models were used to maximize efficiency. The mechanism of leaching was briefly investigated through three kinetic experiments wherein dissolved metals concentrations, pH, and gas production rate were measured, as well as through XRD studies of residual unleached solids. Precipitation of $Ni(COOH)_2$, $Co(COOH)_2$, and $Mn(COOH)_2$ salts was investigated through solubility measurements in ternary solutions of formic acid, lithium formate, and water. The effect of adding lithium formate or lithium carbonate to the solutions was also investigated. Thermal decomposition of lithium formate to lithium carbonate in the presence of trace amounts of Ni, Co, and Mn was investigated and the product was analyzed by XRD. The double displacement reaction between nickel, cobalt, and manganese formates and sulphuric acid was investigated through a simple experiment to confirm that the reaction occurs even when neither reagent nor product salts are fully dissolved.

2. Materials $Li_3NiCoMnO_6$ cathode active material for RSM experiments was supplied as cathode powder (i.e., substantially free of binder and graphite) by Custom Cells Itzehoe GmbH, Germany. Its composition was measured to be 7.49, 18.4, 19.5, 16.9 wt % Li, Ni, Co, and Mn, respectively, with standard deviations of 0.1, 0.7, 0.5, 0.4 wt %, respectively. Mean particle size was measured to be 11.0 μm (95% confidence interval (10.0, 11.9)) with a standard deviation of 4.6 μm. Identity of the powder was confirmed by XRD analysis. $Li_3NiCoMnO_6$ cathode active material for kinetic experiments was supplied as cathode powder by MTI Corp., Richmond, California, USA. Its composition was measured to be 7.4, 17.3, 17.3, 15.7 wt % Li, Ni, Co, and Mn, respectively, with standard deviations of 0.3, 0.6, 0.6, and 0.6 wt %, respectively. Particle size was reported by the manufacturer to be $D_{50}$ 9.0-12.0 μm. Identity of the powder was confirmed by XRD analysis.

Formic acid, 99.2%, was supplied by Alfa Aesar. Sulphuric acid, 95.0-98.0%, and hydrogen peroxide, >30%, were supplied by Fisher Scientific. Potassium dichromate, technical grade, was supplied by Fisher Scientific; its exact purity was not known. Lithium carbonate, 99.5%, was supplied by Sigma Aldrich. Nickel (II) formate dihydrate, 31.7% Ni, cobalt (II) formate dihydrate 31.7% Co, manganese (II) formate dihydrate, 27.8% Mn, and lithium formate monohydrate, 98%, were supplied by Alfa Aesar, Pfaltz & Bauer, Sigma Aldrich, and Fisher Scientific, respectively. The amount of hydration of the formate salts was checked by TGA. All chemicals were used as supplied without further purification.

3. Analytical Methods

Elemental chemical analysis of solids and liquid samples were done by the Analytical Sciences Unit at Queen's University, Kingston, Canada, which is a certified chemical analysis laboratory. Solids were digested in 1:3 $HNO_3$:HCl for 3 hours at 85 to 90° C. and diluted prior to analysis. All liquid samples were analysed by ICP-OES using an adaptation of EPA method 200.7. The instruments used were Agilent Vista AX and Thomas Fisher Scientific ICAP 7400 Duo. Particle size measurements were done by the Dalhousie University Minerals Engineering Center, Halifax Canada. A Malvern MS3000 laser diffraction particle size analyzer was used. XRD analysis was done with a Philips Panalytical X'pert Pro Powder diffractometer with a cobalt anode, tube current 45 mA, and tube voltage 40 kV. Carbon and sulphur analysis of solids was done with a Eltra CS-2000 Carbon-Sulfur analyser. pH measurements were done with a SE 5500-Bio meter with a InLab Routine pH electrode.

A gravimetric chemical oxidation method, adapted in-house from the method developed by Tsiropinas (1917), was used to measure total formate concentrations in liquid samples. An oxidizing solution was made with 90 g of potassium dichromate, 632 g of DI water, and 132 g of $H_2SO_4$. Twenty mL of oxidizing solution was added to a test tube with a one-hole stopper and air condenser, which was then weighed (weight 1). Thirteen mL of sample was added and the total weight was measured again (weight 2). The stoppered test tube was immersed in a water bath, which was then heated to 90° C. Formic acid and formate ions were oxidized to carbon dioxide and released carbon dioxide gas. The oxidation reaction was allowed to proceed for six hours at 90° C. During the last hour no bubbles were released, which indicated that oxidation was complete. The test tubes were removed from the bath, their exterior was dried, and they were weighed again (weight 3). The difference between weight 2 and weight 1 was the weight of the sample. The difference between weight 3 and weight 2 was the weight lost during the reaction. The procedure was calibrated as follows.

Five standard solutions with known amounts of formic acid and a blank were prepared. A solution of lithium, nickel, cobalt, and manganese sulphates was used as solvent in order to match the matrix of the samples. The solution was prepared by digesting NCM111 in 19% (v/v) $H_2SO_4$ and 6% (v/v) $H_2O_2$, diluting, and then filtering. The solution was added to test tubes along with oxidizing solution. After residual $H_2O_2$ oxidized, the test tubes were weighed, formic acid was added, and the test tubes were weighed again. The test tubes were immersed in the same water bath as the samples. Calibration curves were created between mass lost during reaction and moles of formic acid in the standard. The calibration curves were linear with $R^2$ of 1.00.

4. RSM Leaching Experiments Procedure

The design of experiments was central composite circumscribed with α=1.682 and 6 central replicates for a total of 20 runs done in random order. The process variables investigated were liquid to solid ratio, L/S (mL/g); temperature, T (° C.); and $log_{10}$ time, log t (unitless)—time was measured in hours. The dependant variables measured were leaching efficiencies of lithium, cobalt, nickel, and manganese defined by Equation 4.

$$f_x = \frac{\text{mass of } x \text{ in solution and precipitated}}{\text{mass of } x \text{ in initial solids}} \qquad \text{(Equation 4)}$$

High concentrations of formic acid may be hazardous to use because they have flash points at leaching temperatures of interest—for example 80% (v/v) has a flash point of 72.0° C. and 90% (v/v) has a flash point of 62.0° C. (Janes and Chaineaux, 2013). Thus, whereas higher formic acid concentrations will provide faster leaching, the concentration was set to 50% (v/v) in all experiments because it is relatively concentrated and because tests revealed that it does not have a flash point up to boiling. Of course, in other embodiments higher concentrations of formic acid may be used, such as 60%, or 70%, or up to about 80% (v/v), e.g., a range of about 50% to 80% (v/v). In embodiments using higher concentrations of formic acid where there is concern of reaching a flash point, the temperature may be lowered; however, it is recognized that a lower temperature will slow the rate of leaching. Also, in other embodiments lower concentrations of formic acid may also be used, i.e., below 50%; however it is recognized that lower formic acid concentrations will slow the rate of leaching.

One of the assumptions of RSM is that response variables can be modelled as linear or second order polynomials of the independent variables. This assumption was tested by analysis of the leaching efficiencies of lithium reported in the one-factor-at-a-time experiments by Gao et al. (2017). It was found that leaching efficiency was well modelled by second order polynomials of acid concentration, liquid to solid ratio, temperature, and $\log_{10}$ time; but not time itself. For this reason, $\log_{10}$ time, rather than time, was used as an independent variable.

The experimental procedure was as follows. A 50 ml round-bottom flask with a rare earth magnet inside was preheated in an oil bath. A Fisher Isotemp RT Advanced Hotplate Stirrer with an external temperature probe was used to maintain the oil bath's temperature within 1° C. A desired amount of cathode active material was weighed and added to the flask together with 25 mL of 50% (v/v) formic acid solution. A condenser was attached to allow evolved carbon dioxide to vent while minimizing loss of solution by evaporation. The solution was stirred at 500 rpm and was left undisturbed for the duration of the experiment. After the leaching time elapsed, the contests of the flask were transferred to a 1 L beaker. The flask was washed with room temperature deionized water ten times, to remove all the solids and the solution, and the wash water was also transferred to the beaker for a total volume of 700 to 900 mL. The contents of the beaker were stirred for 30 minutes, which was long enough to dissolve all the transition metal formates precipitated during the reaction but not long enough to leach significantly more metals from the residual NCM111.

Afterwards, with the aid of more DI water washing, the entire contents of the beaker were transferred to a volumetric flask and the volume was made up to 1 L. The volume of residual NCM111 was too small to significantly contribute. Samples of the resulting solution were filtered with a 0.45 μm syringe filter and then analysed for concentration of metals and total formate. Residual free formic acid concentration was calculated by subtracting bound formate (the sum of metal concentrations times their respective charges) from total formate. All concentrations were multiplied by 1000 g to given total amounts of metals leached and moles of free formic acid remaining after leaching.
Statistical Analysis of Leaching Efficiencies Leaching efficiencies were modelled with JMP 14.2 statistical software (SAS Institute Inc.) at a significance level of 0.05. Full quadratic models with linear interaction between pairs of parameters were initially proposed. The term with the largest P value above 0.05 was excluded and the model recalculated until only statistically significant terms remained. A linear term (e.g., L/S), even if not statistically significant, was retained if it was present in interaction terms (e.g., L/S·T) or higher order terms (e.g., (L/S)$^2$) that were statically significant.
5. Solubility Experiments Solubilities of Ni$^{2+}$, Co$^{2+}$, and Mn$^{2+}$ in solutions of formic acid, water, and dissolved lithium formate were measured using an 'excess solid' method (Black et al., 2013). Lithium carbonate, formic acid, and water were mixed to 65 to 75 mL total volume. After the carbonate fully reacted, the solutions were transferred to a three-neck 500 mL flask with a condenser. 6.00 g each of cobalt formate dihydrate, manganese formate dihydrate, and nickel formate dihydrate were added and stirred with a rare earth magnet at 120 to 200 rpm. The flask was heated to a desired temperature by an oil bath. Samples were withdrawn periodically with a pre-warmed syringe and were immediately filtered with a 0.2 μm syringe filter. After the samples cooled, they were weighed and diluted to 100 mL with DI water and analysed by ICP-OES. At all temperatures investigated, equilibrium was established within 1 to 2 days.

Additional solubility experiments were performed by adding lithium formate or lithium carbonate to some of the abovementioned solutions after they had reached equilibrium. Samples were then taken and analysed as previously.

Theoretical purity of lithium carbonate obtained after desiccating PLS and thermally decomposing the Li, Ni, Co, and Mn formate salts obtained in air was calculated from the solubility data. Based on previous literature studies, it was assumed that Ni(COOH)$_2$, Co(COOH)$_2$, and Mn(COOH)$_2$ thermally decomposed in air to NiO at 240° C. (Qusti et al., 1997), Co$_3$O$_4$ at 311 to 423° C. (Ingier-Stocka and Grabowska, 1998), and Mn$_2$O$_3$ at 250 to 300'C (Dollimore and Tonge, 1967).
6. Production of Transition Metal Sulphates Procedure A sulphuric acid solution was made by pipetting 5 mL of sulphuric acid into 13.7190 g of water. 5.1931 g each of Ni(COOH)$_2$·2H$_2$O, Co(COOH)$_2$·2 H$_2$O, and Mn(COOH)$_2$·2 H$_2$O were added to the solution. The solution was covered and stirred for 19 hours. pH was measured periodically during the reaction. The solution was then poured into a crystallization dish and evaporated at 109° C. for 19 hours. The salt obtained was analysed by carbon sulphur analyser, ICP OES, and XRD. The weights and volume above were chosen such that there would be approximately 5% excess of sulphuric acid and that the vapour produced, if condensed, would be a 50% v/v formic acid solution.
7. Kinetic Leaching Experiments Procedure A slurry of L/S=5.62 mL/g was prepared by mixing 35.5872 g of NCM111 and 200 mL of 50% v/v formic acid in a 500 mL three-neck flask with a magnetic stirrer and condenser. The flask was immersed in an oil bath and stirred. Liquid samples were withdrawn through a 0.2 μm syringe filter and weighed after they cooled. The filter was backwashed with a 1 mL aliquot of fresh 50% v/v formic acid solution to try to recover solids filtered out and maintain a constant mass of solution in the flask. The rate of gas evolution was measured periodically using a 10 mL soap bubble gas flow meter connected to the top of the condenser. The pH of the solution was also periodically measured. Liquid samples were diluted and analysed by ICP-OES. Solids remaining after leaching were washed with DI water and dried. Samples of them were analysed by XRD.
8. Results
RSM Experiments Experimental conditions, leaching efficiencies, leaching efficiencies predicted by statistical modelling, and residual free formic percentages are given in Table 2 for the 20 RSM experiments and for three model confirmation experiments (C1 to C3). Leaching efficiencies of Ni, Mn, and Co were not significantly different in any of the experiments. Therefore, an average leaching efficiency (fA) is reported and was used in statistical modeling.

TABLE 2

RSM experimental results: liquid to solid ratio (L/S), temperature (T), leaching time (Time),
Li leaching efficiency (fLi), average of Co, Ni, and Mn leaching efficiencies (fA), predicted
leaching efficiencies (fLi' and fA'), and percentage of free formic acid left over
after leaching. Individual ± values represent calculated 95% confidence intervals.

| Experiment | L/S (mL/g) ± 0.01 | T (° C.) ± 1 | Time (h) ± 0.3 | fLi × 100 (%) | fA × 100 (%) | fLi' × 100 (%) | fA' × 100 (%) | % residual free formic acid (%) |
|---|---|---|---|---|---|---|---|---|
| 1 | 3.95 | 67 | 8.9 | 82 | 69 | 84 ± 8 | 72 ± 12 | 48 ± 3 |
| 2 | 3.95 | 67 | 25.1 | 89 | 78 | 88 ± 8 | 80 ± 12 | 44 ± 3 |
| 3 | 7.29 | 67 | 8.9 | 90 | 83 | 89 ± 8 | 84 ± 12 | 67 ± 3 |
| 4 | 7.29 | 67 | 25.1 | 95 | 96 | 94 ± 8 | 92 ± 12 | 62 ± 3 |
| 5 | 3.95 | 88 | 8.9 | 95 | 88 | 97 ± 8 | 89 ± 12 | 36 ± 4 |
| 6 | 3.95 | 88 | 25.1 | 97 | 91 | 101 ± 8 | 98 ± 12 | 34 ± 4 |
| 7 | 7.29 | 88 | 8.9 | 86 | 79 | 89 ± 8 | 82 ± 12 | 66 ± 3 |
| 8 | 7.29 | 88 | 25.1 | 93 | 94 | 93 ± 8 | 90 ± 12 | 65 ± 5 |
| 9 | 5.62 | 78 | 6.3 | 96 | 90 | 91 ± 7 | 84 ± 12 | 55 ± 3 |
| 10 | 5.62 | 78 | 35.5 | 102 | 100 | 99 ± 7 | 99 ± 12 | 51 ± 4 |
| 11 | 2.81 | 78 | 15.1 | 96 | 88 | 96 ± 7 | 81 ± 13 | 11 ± 4 |
| 12 | 8.43 | 78 | 15.1 | 90 | 82 | 94 ± 7 | 85 ± 13 | 71 ± 4 |
| 13 | 5.62 | 60 | 15.1 | 80 | 78 | 81 ± 8 | 77 ± 13 | 61 ± 2 |
| 14 | 5.62 | 95 | 15.1 | 96 | 93 | 92 ± 8 | 90 ± 13 | 53 ± 4 |
| 15 | 5.62 | 78 | 15.1 | 96 | 91 | 95 ± 7 | 92 ± 11 | 52 ± 4 |
| 16 | 5.62 | 78 | 15.1 | 93 | 85 | 95 ± 7 | 92 ± 11 | 53 ± 4 |
| 17 | 5.62 | 78 | 15.1 | 96 | 94 | 95 ± 7 | 92 ± 11 | 51 ± 3 |
| 18 | 5.62 | 78 | 15.1 | 96 | 92 | 95 ± 7 | 92 ± 11 | 51 ± 3 |
| 19 | 5.62 | 78 | 15.1 | 98 | 94 | 95 ± 7 | 92 ± 11 | 51 ± 4 |
| 20 | 5.62 | 78 | 15.1 | 93 | 87 | 95 ± 7 | 92 ± 11 | 51 ± 4 |
| C1 | 2.81 | 92 | 35.5 | 101 | 109 | 106 ± 10 | 100 ± 16 | −2 ± 2 |
| C2 | 2.81 | 92 | 35.5 | 99 | 109 | 106 ± 10 | 100 ± 16 | 0 ± 2 |
| C3 | 3.45 | 95 | 26.3 | 93 | 96 | 102 ± 10 | 99 ± 16 | 23 ± 2 |

Experimentally determined leaching efficiencies, fLi and fA, from the 20 RSM experiments were fitted with statistical models, Equation 5, and Equation 6, respectively. Tests of mean squared regression, lack of fit, and significance of parameters, as well as graphical diagnostics, showed that these models were adequate. $R^2$ was 0.78 and 0.76 for fLi' and fA' respectively. Furthermore, each observed leaching efficiency is contained within the confidence interval of the model prediction (see Table 2). Lastly, three model confirmation experiments were performed at conditions that were predicted by the models to be minimally sufficient to achieve complete leaching; the leaching efficiencies observed were also contained within the confidence intervals of the model predictions.

$$fLi' = 61.3 - 0.385 \cdot \frac{L}{S} + 0.303 \cdot T + 10.6 \cdot \log(t) - \quad \text{(Equation 5)}$$

$$0.194 \cdot \left(\frac{L}{S} - 5.62\right) \cdot (T - 77.5) - 0.0287 \cdot (T - 77.5)^2$$

$$fA' = 36.2 + 0.692 \cdot \frac{L}{S} + \quad \text{(Equation 6)}$$

$$0.377 \cdot T + 19.0 \cdot \log(t) - 1.05 \cdot \left(\frac{L}{S} - 5.62\right)^2 - $$

$$0.281 \cdot (L/S - 5.62) \cdot (T - 77.5) - 0.0250 \cdot (T - 77.5)^2$$

Residual formic acid values in Table 1 were compared with theoretical formic acid usage. Based on Equation 1, it was assumed that for every mol of Ni, Co, or Mn leached, 2.5 mol of free formic acid were consumed. Also assumed was that for every mol of Li, 1 mol of free formic acid was consumed. Actual values of free formic acid consumed were plotted vs. the theoretical values. The plot was linear with a slope of 1.00, R2 of 0.99, and a statistically significant intercept of 0.013 mol. The intercept represents 4% of the initial formic acid added to the experiments and was judged an acceptable loss.

Optimization of Leaching Efficiency Models

In both Equation 5 and Equation 6, log t was a linear term with a positive coefficient. Thus, the models predicted that, within the bounds of the experimental conditions studied, leaching efficiency increased monotonically with time and at an equal rate for any L/S and T combination. L/S and T were present as linear, quadratic, and interaction terms; therefore, there were only certain operating regions where leaching efficiency was at a maximum. To find those regions, contour plots of fLi' and fA' vs. L/S vs. T were constructed, see FIGS. 2 and 3.

Generally, the contour plots predicted maximum leaching efficiencies of 100% at high T and low L/S for both Li and Ni, Co, and Mn. There was a slight difference between predicted optimal conditions, leaching of Li was favoured at the smallest L/S possible and T=92° C. while leaching of Ni, Co, and Mn was favoured at the highest temperature and L/S=3.60 mL/g. However, since in embodiments any free formic acid remaining after leaching is neutralized and reacted to carbon dioxide, it is desirable to leach at as low L/S as possible in order to minimize loss of formic acid. Optimal leaching conditions were therefore taken as L/S=2.81 mL/g and T=95° C. The models predict 100% leaching efficiency after 30 hours at these conditions.

Discussion of RSM Results

It was not expected that a lower L/S would improve leaching efficiency. All experiments contained the same amount of formic acid, thus lowering L/S by adding more powder was expected to decrease leaching efficiency given the higher demand for formic acid. Without wishing to be bound by theory, one possible explanation for the unexpected finding is that one of the leaching products stimulated further leaching. A possible species is formate, which is produced in large amounts during leaching in the form of dissolved lithium formate. It is known that the oxidation of formic acid to carbon dioxide proceeds via multiple pathways, one of which is via formate 43,44. If the formate pathway were favourable in NCM 111 leaching, then production of lithium formate would indeed be beneficial to leaching efficiency. This may be confirmed by adding amounts of lithium formate to lixiviant and comparing leaching efficiencies.

Figure 4:
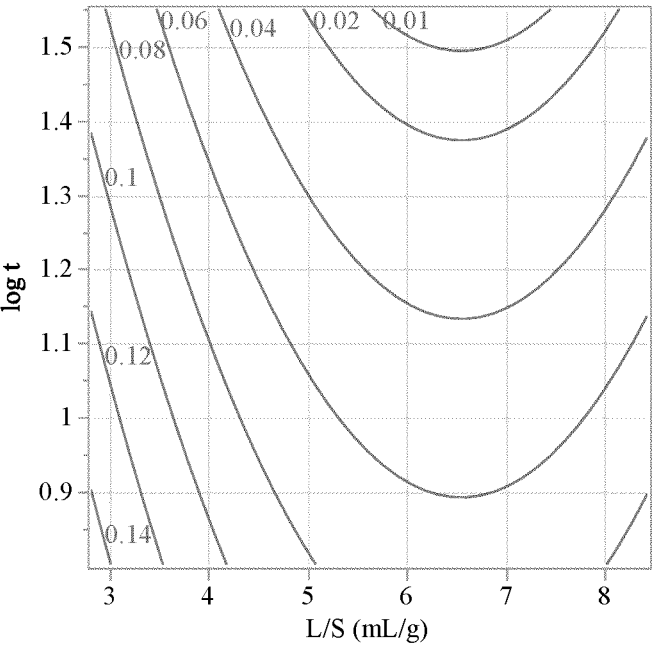
FIG. 4 is a (fLi-fA)' contour plot.

Leaching efficiencies of lithium were generally greater than those of nickel, cobalt, and manganese in Table 1. To investigate this difference, fLi-fA was modelled statically as a function of log t and L/S—there were no statistically significant terms with T. A contour plot of predicted leaching efficiency difference, (fLi-fA)', vs. log t and L/S was constructed. FIG. 4 shows that the difference between leaching efficiencies narrowed as leaching time increased and widened as L/S deviated from 6.55 mL/g. It also shows that lithium leaching efficiency was consistently greater than that of nickel, cobalt, or manganese. This finding suggests that there are at least two different leaching reactions occurring and that Equation 1 is the summation of those reactions. Those reactions will be discussed below.

Figure 5:
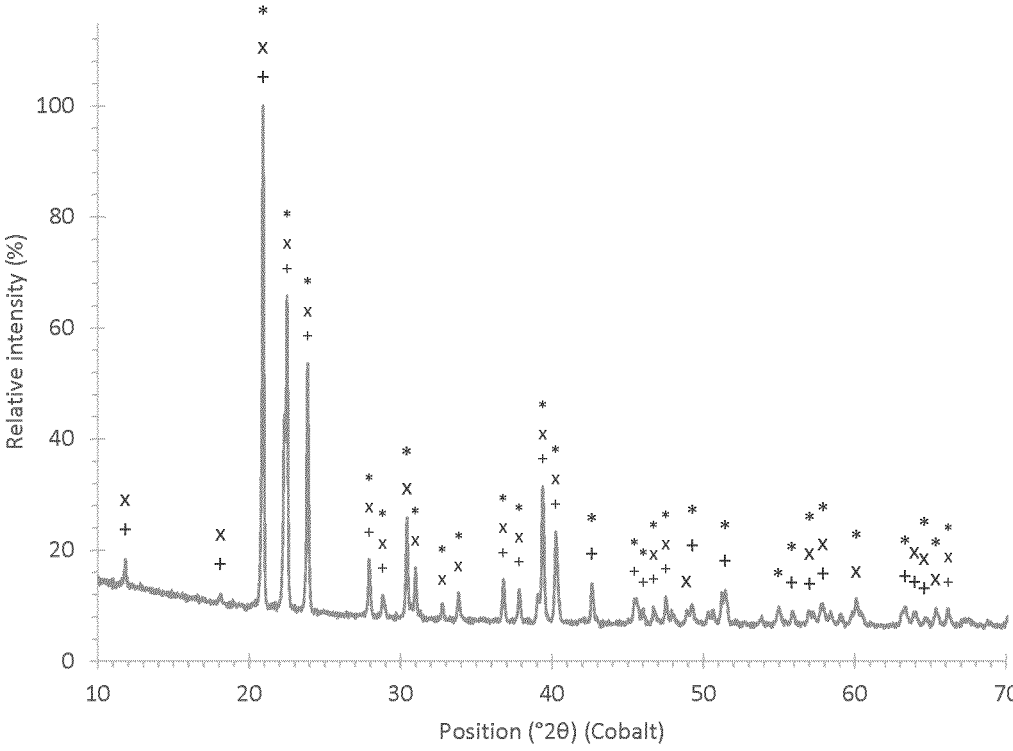
FIG. 5 is an X-ray diffraction (XRD) pattern obtained for precipitate from a leaching experiment (L/S=5.63 mL/g, T=95° C., leaching time 5 days), wherein peaks of $Co(COOH)2·2H2O$ (ref. 00-021-0257) are marked with *, $Mn(HCOO)\ 2·2(H2O)$ (ref. 01-074-6899) are marked with x, and $Ni(HCOO)2·2(H2O)$ (ref. 01-074-7014) are marked with +, according to one embodiment.

Solubility of Ni, Co, and Mn in Solutions of Formic Acid, Water, and Dissolved Lithium Formate The identity of precipitates from leaching NCM111 with formic acid was confirmed by letting a leaching experiment (L/S=5.63 mL/g, T=95° C.) run for five days. The precipitate formed was filtered, double washed with DI water, dried and analysed by XRD. As can be from FIG. 5 (wherein peaks of $Co(COOH)_2 \cdot 2H_2O$ (ref. 00-021-0257) are marked with *, $Mn(HCOO)_2 \cdot 2(H_2O)$ (ref. 01-074-6899) are marked with x, and $Ni(HCOO)_2 \cdot 2(H_2O)$ (ref. 01-074-7014) are marked with +), the precipitate is a mixture of cobalt formate dihydrate, manganese formate dihydrate, and manganese formate dihydrate.

Figure 6:
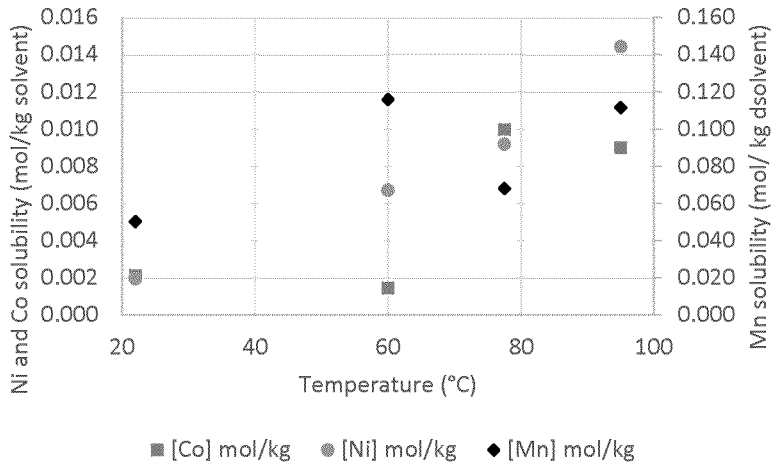
FIG. 6 is a plot showing solubilities of Co (squares) and Ni (circles) on left axis and Mn (diamonds) on right axis in 1 M LiCOOH and 45 wt % formic acid, according to one embodiment.
Figure 7:
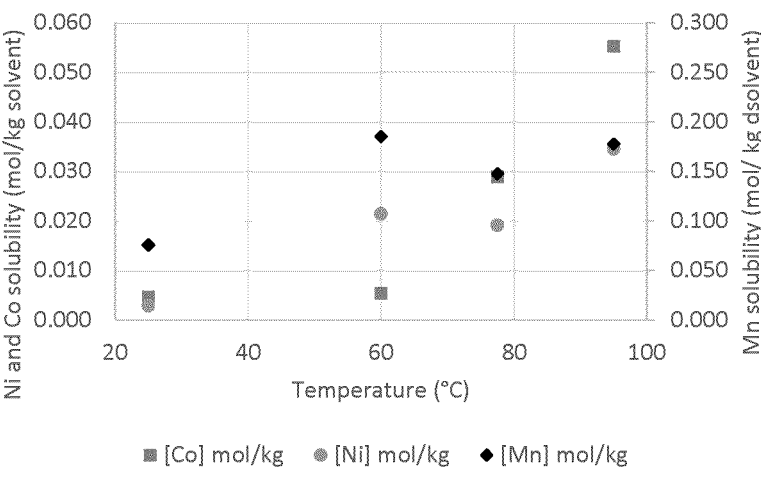
FIG. 7 is a plot showing solubilities of Co (squares) and Ni (circles) on left axis and Mn (diamonds) on right axis in 6 M LiCOOH and 5 wt % formic acid, according to one embodiment.

Solubilities of Ni, Co, and Mn were measured in synthetic PLS of formic acid, water, and lithium formate. Two combinations of lithium and formic acid and concentrations were investigated: 6.0 M Li in 5 wt. % formic acid and 1.0 M Li in 45 wt. % formic acid. These concentration combinations were taken as representative of the PLS compositions obtained at the end of the 20 RSM experiments. Solubilities were measured at 60, 78, and 95° C. as well as room temperature, see FIGS. 5 and 6. Although there was a general increase of solubility with temperature and a greater solubility of manganese than of nickel or cobalt, the trend in which cobalt, nickel, and manganese were more soluble in the high-lithium low-formic acid solution was unexpected.

The solubility data was used to calculate expected purity of lithium carbonate after desiccating PLS and thermally decomposing the salts obtained. As can be seen in the first eight rows of Table 3, the calculated purity was below that of battery grade lithium carbonate (>99.5 wt. %). In an effort to increase the purity, lithium formate was added to the 5 wt. % formic acid solution; since lithium formate shares a common anion with the manganese, nickel, and cobalt formates it was expected that their solubility would decrease. As can be seen in the 9th and 10th rows of Table 3, their solubility did indeed decrease but not enough to increase the lithium carbonate purity to >99.5 wt. %. To increase the lithium carbonate purity, the 5 wt. % synthetic PLS solution was saturated with lithium carbonate. As can be seen in the last two rows of Table 3, this was successful and yielded purities of 99.99 and 99.97 wt. % for PLS at 60 and 95° C. respectively.

TABLE 3

Synthetic leachate composition and calculated $Li_2CO_3$ purity from synthetic leachate solutions (first eight rows), synthetic leachate enriched with lithium formate (next three rows), and synthetic leachate saturated with lithium carbonate (last two rows).

| [Formic acid] (wt % in solution) | T (° C.) | [Li] (mol/kg) | [Ni] + [Co] + [Mn] (mmol/kg) | $Li_2CO_3$ calculated purity (wt %) |
|---|---|---|---|---|
| 45% | 22 | 1.07 | 54 | 90.59% |
| 45% | 60 | 1.02 | 124 | 80.23% |
| 45% | 78 | 1.07 | 87 | 86.52% |
| 45% | 95 | 1.07 | 135 | 80.62% |
| 5% | 25 | 5.43 | 83 | 96.93% |
| 5% | 60 | 6.10 | 212 | 93.75% |
| 5% | 78 | 5.71 | 195 | 93.77% |
| 5% | 95 | 5.81 | 267 | 92.03% |
| 5% | 95 | 10.56 | 152 | 97.21% |
| 5% | 95 | 14.90 | 117 | 98.45% |
| 5% | 95 | 16.64 | 107 | 98.73% |
| 0% * | 60 | 7.83 * | 0.5 | 99.99% |
| 0% * | 95 | 7.90 * | 1.3 | 99.97% |

* The initial composition of synthetic leachate before adding lithium carbonate was 5 wt % formic acid and 5.81 mol Li/kg solvent.

Given the high purities calculated above, adding lithium carbonate to filtered PLS and filtering again provides a method for producing high purity carbonate; however, it has two considerations that need to be kept in mind when implemented. The first is that residual formic acid in the PLS is neutralized, which needlessly wastes it since formates are decomposed in the subsequent thermal decomposition step. Therefore, in order to minimize waste, it is important that leaching be conducted at the smallest L/S ratio possible so that residual formic acid is minimized, ideally to zero. The second drawback is that two solid liquid separation steps are required. If the first solid liquid separation step is omitted and lithium carbonate is added to the unfiltered PLS, the equilibrium of Ni, Co, and Mn formate salts would be continuously disturbed towards dissolution until they are completely dissolved and re-precipitated as carbonate salts. Not only would omitting the first solid liquid separation step result in a large consumption of lithium carbonate but it would also obviate the advantage of nickel, cobalt, and manganese formates spontaneously precipitating during leaching.

In leaching experiment C1 complete leaching was achieved with initial L/S=2.81 mL/g, 28 g of initial 50% v/v formic acid solution (density 1.12 g/mL), T=95° C., 0% free formic acid remaining, and 15.81 g final calculated solvent mass. Utilizing the solubility results in Table 3, of the 0.085 mol of Ni, Co, and Mn leached, 95% precipitated as formate salts. After solid-liquid separation, at least 0.033 mol $Li_2CO_3$ (1.05 mol per kg solvent) must be added to the solution to saturate it with $Li_2CO_3$. Again using the solubility results in Table 3, adding lithium carbonate precipitated 99% of the remaining Ni, Co, and Mn. The solution was pure enough that if the salts therein were crystallized, desiccated, and thermally decomposed, lithium carbonate of greater purity than battery grade (>99.5%) would be obtained. The mixture of $NiCO_3$, $CoCO_3$, $MnCO_3$, and unused $Li_2CO_3$ left over after the final solid liquid separation can be reused for purification of the next batch or added back to the leaching reactor.

Production of Transition Metal Sulphates

Figure 8:
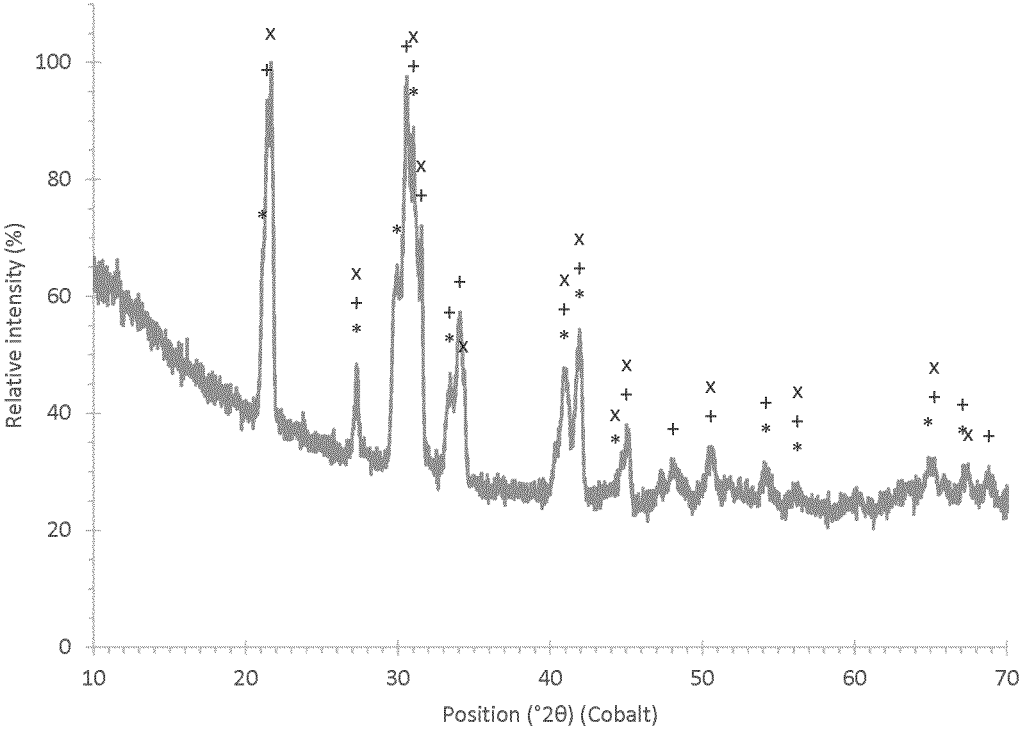
FIG. 8 is an XRD pattern of solids obtained after reacting $Ni(COOH)2.2(H2O)$, $Co(COOH)2·2(H2O)$, and $Mn(COOH)2·2(H2O)$ with 40 wt % sulphuric acid (L/S=1.13 mL/g), wherein peaks of $NiSO4·H2O$ (ref. 00-021-0974) are marked with x, $Co(SO4)·H2O$ (ref. 01-070-2104) are marked with +, and $MnSO4·H2O$ (ref. 00-033-0906) are marked with *, according to one embodiment.

Ni, Co, and Mn formates were reacted with a 40 wt. % sulphuric acid solution (L/S=1.13 mL/g) with stirring at room temperature. Within the first minutes 30 minutes, the pH stabilised to −0.41 (it was −0.43 after 19 hours). Also, the solids changed colour from pink to brown and did not change colour again. Both observations suggest that the reaction was largely completed in the first 30 minutes. After 19 hours, the slurry was desiccated. The composition of the resulting powder, by ICP-OES analysis, was 11, 10, 8.8, and 19 wt. % Ni, Co, Mn, and S respectively, and, by Carbon-Sulphur analysis, 0.13 and 18.58 wt. % C and S respectively. Based on the residual carbon composition, 99% of the formate reacted. Based on the ICP analysis, there was 16% excess (mole basis) sulphuric acid. An XRD analysis of the powder, FIG. 8 (wherein peaks of $NiSO_4 \cdot H_2O$ (ref. 00-021-0974) are marked with x, $Co(SO_4) \cdot H_2O$ (ref. 01-070-2104) are marked with +, and $MnSO_4 \cdot H_2O$ (ref. 00-033-0906) are marked with *), confirmed that it was a mixture of Ni, Co, and Mn sulphate hydrates.

Since recovery of formic acid involves evaporation and condensation, the sulphuric acid solution's water content has a significant impact on the energy requirement for recovery. Some water needs to be present in the system, otherwise the sulphuric acid will decompose formic acid to carbon monoxide. The amount of water was chosen such that the composition of formic acid, had it been condensed, was 50% v/v; and a high yield was demonstrated with this amount of water. The result suggests that using less water maintains a high yield of formic acid, which is favourable for a green chemistry process.

Kinetic Experiments

Three kinetic experiments were performed with L/S=5.62 mL/g at T=60, 78, and 95° C. The resultant concentrations of Li, Ni, Co, and Mn in filtered PLS, PLS pH, and rates of gas production are given in FIGS. 9A-9F.

Concentrations of Ni and Co decreased and then stabilised. Concentrations of Mn briefly increased and then decreased. These observations are consistent with a PLS that becomes supersaturated (first with Ni and Co, which have a lower solubility, and then with Mn) followed by a quick precipitation of Ni, Co, and Mn down to their solubility limit. These findings suggest that production of Ni, Co, and Mn formates is kinetically limited by the leaching reaction. Thus, once leaching is complete, precipitation is also complete and downstream processing can occur immediately.

Figures 9A, 9B, 9C, 9D, 9E, 9F:
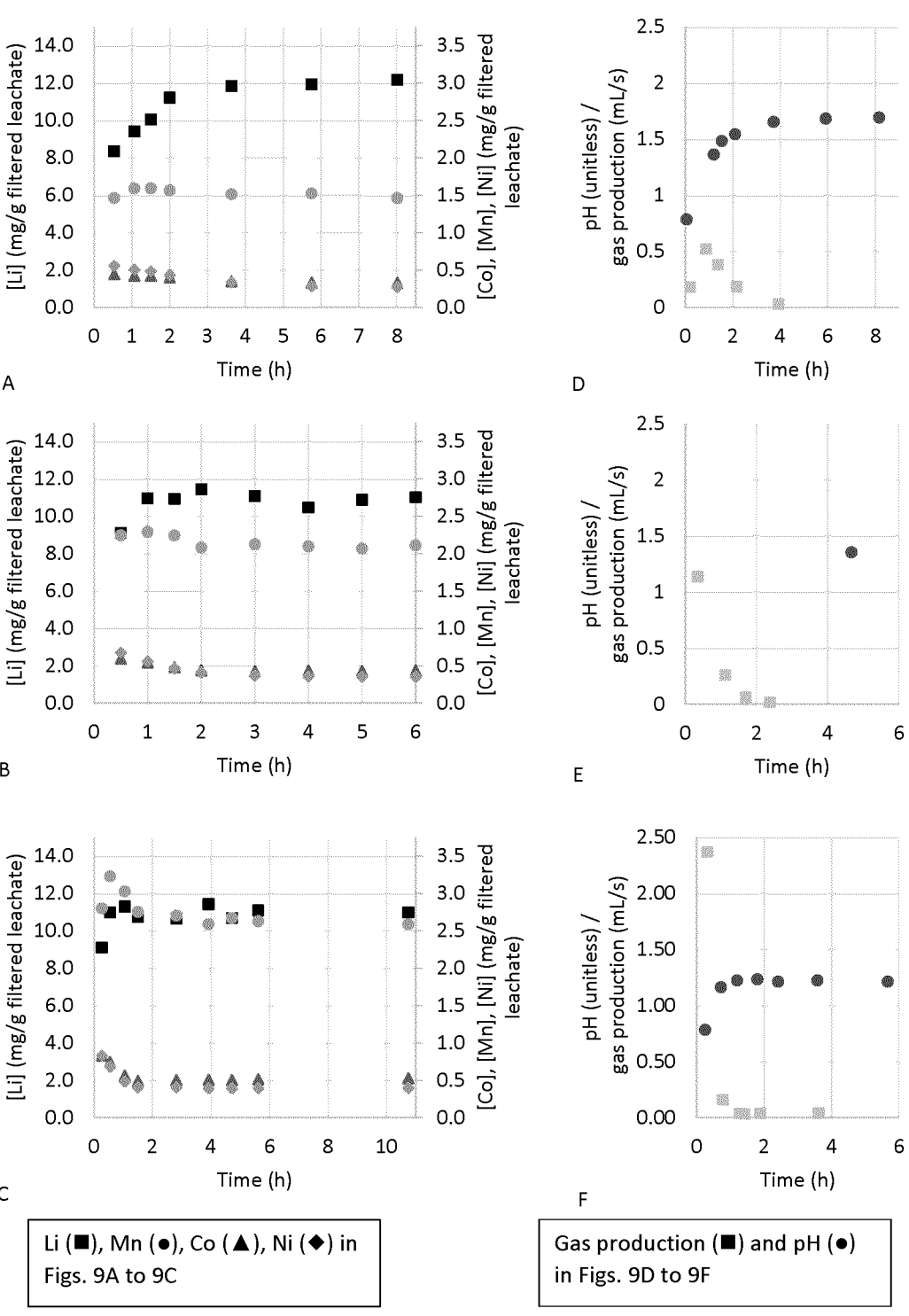
FIGS. 9A-9C are plots showing concentrations of Li (■), Mn (●), Co (▲), and Ni (♦) in filtered leachate at 60, 77.5, and 95° C. respectively.
FIGS. 9D-9F are plots showing pH (●) and gas production rates (■) at 60, 77.5, and 95° C. respectively; L/S=5.62 mL/g in all experiments.

In FIGS. 9A-9C, the concentration of Li increased within the first 1-2 hours and then stabilized. However, this does not suggest that leaching of lithium stopped after 2 hours. Even though efforts were taken to replace solvent lost due to sampling, the mass of solvent (mass of water plus formic acid) decreased during leaching by 1.20 g per g of NCM 111 leached (calculated using Equation 1). This loss was substantial enough that it was not possible to precisely calculate leaching efficiencies from the concentration data. However, it was possible to estimate them. If solvent loss was ignored, leaching efficiencies of Li were 103, 101, and 104% after 2.00 h at 60° C., 1.00 h at 78° C., and 1.05 h at 95° C. respectively. If solvent loss consistent with complete leaching occurred immediately at the start of the experiments, then leaching efficiencies of Li were 85, 83, 86% after 2.00 h at 60° C., 1.00 h at 78° C., and 1.05 h at 95° C. respectively. The actual leaching efficiencies were somewhere in between these extremes. Regardless of the actual values, it is evident that lithium leached at a very high initial rate.

Figure 10:
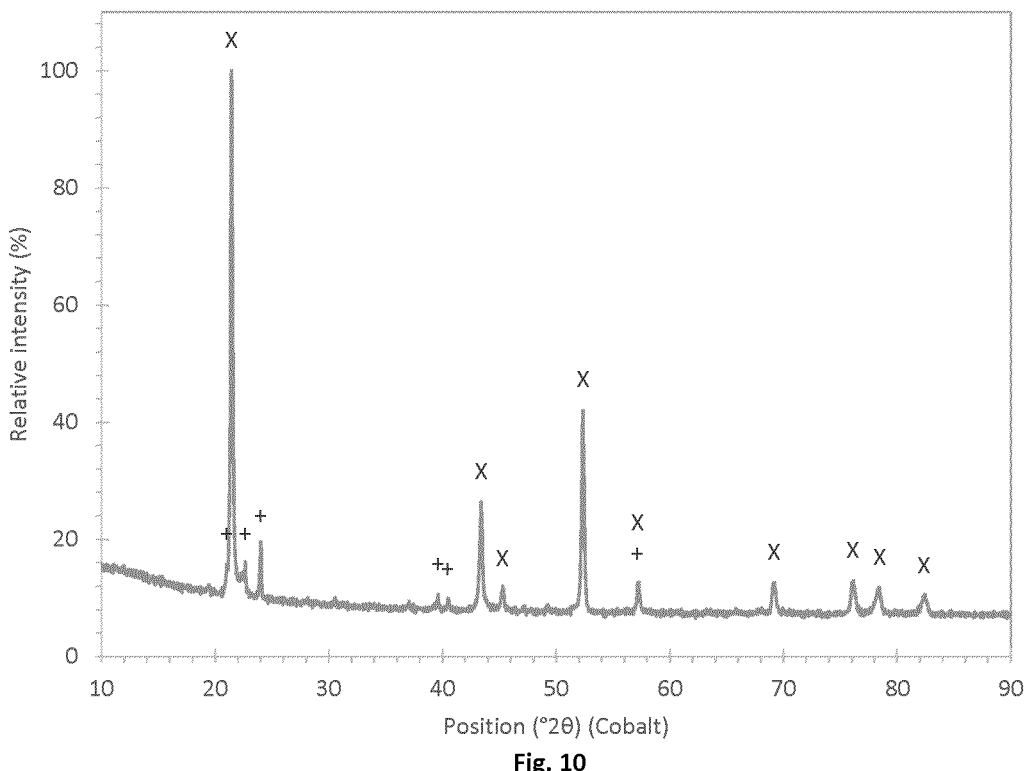
FIG. 10 is an XRD pattern from a kinetic experiment at 95° C., L/S=5.62 mL/g after leaching for 11 hours, wherein $Co0.327Li0.556Mn0.338Ni0.33202$ (ref. 01-076-8273) peaks are marked with X and $Co(COOH)2·2H2O$ (ref. 00-021-0257) peaks are marked with +, according to one embodiment.
Figure 11:
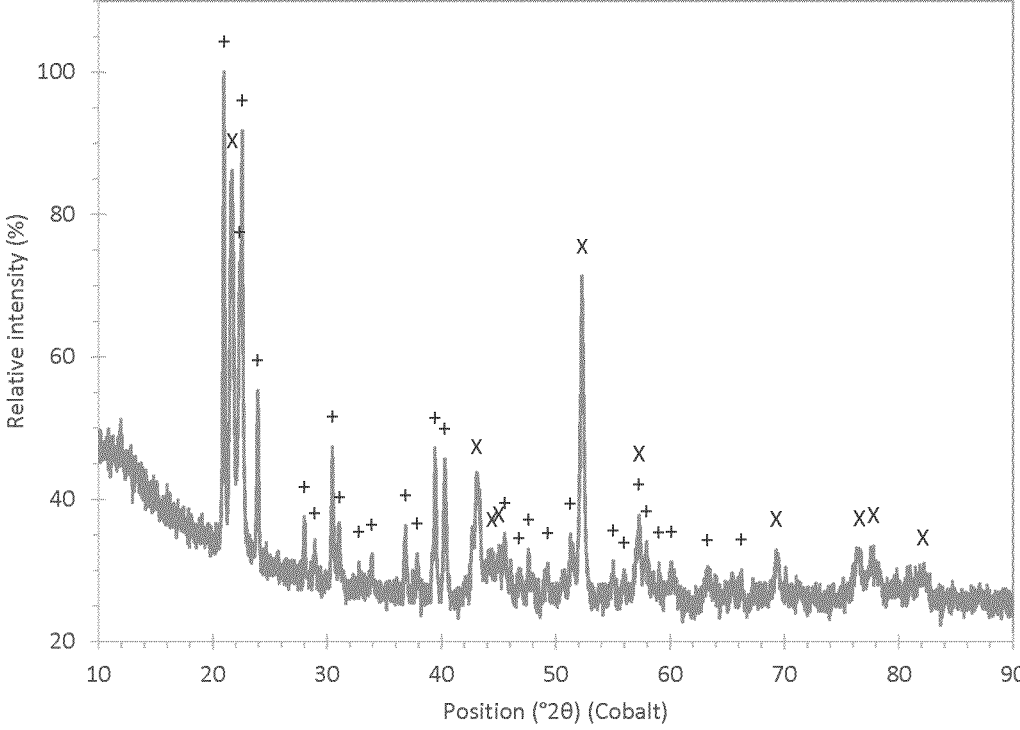
FIG. 11 is an XRD pattern from a C3 experiment at 95° C., L/S=3.45 mL/g after leaching for 26.3 hours, wherein $Co0.4LiMn0.3Ni0.3O2$ (ref. 01-080-5072) peaks are marked with X and $Co(COOH)2·2H2O$ (ref. 00-021-0257) peaks are marked with +, according to one embodiment.

The high initial rate of leaching of lithium observed, coupled with the consistent difference between leaching efficiencies of Li and of Ni, Co, and Mn in RSM experiments suggests that delithiated NCM 111 compounds were produced during leaching. The existence of these compounds was confirmed by XRD analysis of leaching residue from the 95° C. kinetic experiment and RSM experiment C3 (see FIGS. 10 and 11).

Referring FIGS. 9D-9F, in the kinetic experiments PLS pH increased quickly during the early leaching period and then stabilized, since leaching consumed H+ and produced lithium formate, a pH buffer. Gas production started low, increased quickly, and then dropped off to barely measurable levels early in the leaching period. Qualitative observations of gas production in the RSM experiments match these measurements. Since oxidation of formic acid is accompanied by release of CO2 gas, it is concluded that the majority of formic acid oxidation occurred early during leaching.

Based on observations in these experiments, it was concluded that leaching proceeded in two phases: a first phase when most of the lithium leached, pH increased, and gas was produced and a second phase when leaching of metals was slower, pH was higher but stable, and little gas was produced. The existence of two phases leads to a question of whether leaching in the second phase was slow because of solid-specific or solution-specific reasons.

A solid-specific reason is that it is more difficult to leach metals out of delithiated NCM 111 than out of lithiated NCM111. Another is that the crystal structure of NCM111 remained relatively stable (even after it was depleted of lithium and enriched with electrons from formic acid oxidation) and thus further leaching of metals was hindered. A solution-specific reason is that the increase in pH or the depletion in free formic acid may decelerated leaching in the second phase. If leaching was slow due to solution-specific reasons, then replacing PLS with fresh lixiviant or adding additional formic acid after the first phase would greatly speed up the second phase, and even faster leaching would be achieved. Thus in some embodiments leaching may be carried out in semi-batch mode (solids are retained, fresh lixiviant is periodically added, and, if desired, PLS is periodically removed).

Atom Economy, Reuse of Water and Formic Acid, and Effluents

The overall chemical equation for an embodiment of a process is given in Equation 7 by adding Equation 1, Equation 2, and Equation 3. Equation 7 makes two assumptions: that water vapour produced during thermal decomposition is not recovered and that vapours, from dewatering PLS and drying Ni, Co, Mn salts, are condensed and reused. Based on Equation 7, the atom economy of the process is 83.8% and up to 57% of the formic acid needed for leaching can be recycled and reused. A water balance was calculated using Equation 7 and an initial leaching L/S ratio of 2.81 mL/g. The water balance showed that up to 66% of the water needed for leaching can be recovered and reused.

$$2Li_3Ni_xCo_yMn_zO_{6(s)}+9HCOOH_{(aq)}+3O_{2(g)}+$$
$$6H_2SO_{4(aq)}+(12x+14y+2z-12)H2O_{(l)} \rightarrow$$
$$3Li_2CO_{3(s)}+6CO_{2(g)}+3H_2O_{(g)}+(2x)NiSO_4 \cdot 6H_2$$
$$O_{(s)}+(2y)CoSO_4 \cdot 7H_2O_{(s)}(2z)MnSO_4 \cdot H_2O_{(s)} \qquad \text{(Equation 7)}$$

Embodiments produce no solid or liquid waste but do produce two gas effluents. The first is carbon dioxide produced during leaching, which as described above can be used in preliminary recycling steps, such as in deactivating LIBs during shredding. The second is a mixture of carbon dioxide, air, and steam from the thermal decomposition step, wherein heat and/or water may be recovered before it is vented.

Working Example 2

Lithium-ion batteries may be leached with solutions that include sulphuric acid. In this example a method based on the above embodiments, with some modifications, may be used to recover nickel, cobalt, manganese, and lithium, as well as copper and aluminium (if present) from the pregnant leach solution.

One or more soluble metal formate salt (lithium formate is a non-limiting example) or formic acid are added to the pregnant leach solution. The nickel, cobalt, manganese, aluminium, and copper react by a double displacement reaction as described in Equation 8 below (lithium formate is used as a non-limiting example in the reaction) and precipitate:

$$M_x(SO_4)_{x/2(aq)} + xLiCOOH_{(aq)} \cdot yH_2O \rightarrow$$
$$M(COOH)_x \cdot yH_2O_{(s)} + (x/2)Li_2SO_{4(aq)} \qquad \text{(Equation 8)}$$

Care must be taken to ensure that the pH of the PLS is not too low, otherwise the double displacement reaction will not result in precipitated formate salts. Thus, if formic acid is added to the PLS, a suitable neutralizing agent, such as, for example, a hydroxide base, may be employed to adjust the pH.

The precipitated formate salts are filtered and can be converted, if desired, to solid sulphate salts by the methods described above. The formic acid obtained during the production of sulphate salts can be reacted with a suitable hydroxide salt (e.g., sodium hydroxide if sodium formate is used, lithium hydroxide if lithium formate is used) to remake the soluble metal formate salt used earlier. If formic acid was used as the precipitating agent, the formic acid obtained from solid sulphate salts production can be used as is, or diluted, or concentrated with no chemical modification.

Lithium carbonate may be obtained from the lithium left dissolved in the PLS after the precipitated formate salts are filtered out by the methods described above. Due to the presence of sulphate ions as well as possible ions of other metals not found in cathode active material of lithium-ion batteries (e.g., ions that may have been added with the precipitated formate agent, or neutralizing agent if formic acid was used as precipitating agent), the lithium carbonate obtained may not be of as high a purity as previously obtained.

Method

A solution of $NiSO_4$ was prepared by mixing 1.4 g of $NiSO_4 \cdot 7H_2O$ salt with deionized water. The solution was clear, intensely green, and had a pH of 4. Three 20 mL aliquots of the solution were placed in glass vessels. Five 5 mL of formic acid were added to the first vessel, 5 g of $LiCOOH \cdot H_2O$ were added to the second vessel, and nothing was added to the third vessel (it served as control). All three vessels were well stirred and the pH of the first two vessels was immediately measured, and was 1 in the first vessel and 5 in the second vessel. The vessels were left undisturbed. In the first 5 minutes there was no precipitate. Within the next 15 minutes a precipitate appeared in the second vessel but not in either of the other two vessels. The pH was measured again in the second vessel, it was still 5. All three vessels were left undisturbed for one day. No precipitation occurred in the first or third vessels and the pH stayed the same in all vessels. Next, a further 1 g of lithium formate was added to the second vessel so as to have, theoretically, by stoichiometry, enough formate to precipitate all nickel. The contents of the second vessel were then stirred well and the vessel was drained. A substantial amount of precipitate was left attached to the vessel walls. The drained solution was filtered and the filtered solution was a much lighter green compared to the solution in the control vessel. The large amount of precipitate formed and the large discoloration both indicate that a substantial amount of nickel formate precipitated. The fact that no precipitation occurred in the first vessel suggests that the presence of formate alone is insufficient to achieve precipitation, the pH must also be high enough. Based on the pH measurements, for precipitation to occur from a solution of nickel sulphate that contained formate ions the pH should be more than 1; 5 was found to be sufficient but lower values may also work provided that they are more than 1. Since formic acid decreases pH, it is not a suitable precipitating agent unless pH is maintained high enough by adding a suitable agent such as a hydroxide base as well.

As previously shown, manganese and cobalt formates also have low solubility. Literature shows that aluminium and copper formates also have a low solubility. Given the low solubility of these four salts, it is expected that similar results will be obtained with solutions containing one or more of sulphates of nickel, cobalt, manganese, aluminium, or copper.

Thus, embodiments include recovering one or more of nickel, cobalt, manganese, aluminium, and copper from a sulphate solution, wherein a formate compound is added to the sulphate solution and the one or more of nickel, cobalt, manganese, aluminium, and copper are precipitated as formate salts, which can then be filtered from the solution. The pH of the sulphate solution after adding the formate compound should be greater than about 1 and less than about 10. The formate compound may be at least one of lithium formate, sodium formate, potassium formate, calcium formate, barium formate, ammonium formate, cesium formate, rubidium formate, magnesium formate, and pure or diluted formic acid. In embodiments wherein formic acid is used as the formate compound, a neutralizing agent may be added to the sulphate solution to maintain the pH to be greater than about 1 and less than about 10.

The contents of all cited documents are incorporated herein by reference.

EQUIVALENTS

While the invention has been described with respect to illustrative embodiments thereof, it will be understood that various changes may be made to the embodiments without departing from the scope of the invention. Accordingly, the described embodiments are to be considered exemplary and the invention is not to be limited thereby.

REFERENCES

Black, S., Dang, L., Liu, C., Wei, H., 2013. On the Measurement of Solubility. Org. Process Res. Dev. 17, 486-492. https://doi.org/10.1021/op300336n Chagnes, A., Pospiech, B., 2013. A brief review on hydrometallurgical technologies for recycling spent lithium-ion batteries. J. Chem. Technol. Biotechnol. 88, 1191-1199. https://doi.org/10.1002/jctb.4053

Diekmann, J., Hanisch, C., Loellhoeffel, T., Schalicke, G., Kwade, A., 2016. (Invited) Ecologically Friendly Recycling of Lithium-Ion Batteries—the LithoRec Process. ECS Trans. 73, 1-9. https://doi.org/10.1149/07301.0001ecst Dollimore, D., Tonge, K. H., 1967. The thermal decomposition of zinc and manganous formates. J. Inorg. Nucl. Chem. 29, 621-627. https://doi.org/10.1016/0022-1902(67)80317-8

Gao, W., Zhang, X., Zheng, X., Lin, X., Cao, H., Zhang, Y., Sun, Z., 2017. Lithium Carbonate Recovery from Cathode Scrap of Spent Lithium-Ion Battery: A Closed-Loop Process. Environ. Sci. Technol. 51, 1662-1669. https://doi.org/10.1021/acs.est.6b03320

Gao, W., Liu, C., Cao, H., Zheng, X., Lin, X., Wang, H., 2018. Comprehensive evaluation on effective leaching of critical metals from spent lithium-ion batteries. Waste Manag. 75, 477-485. https://doi.org/10.1016/j.wasman.2018.02.023

Golmohammadzadeh, R., Faraji, F., Rashchi, F., 2018. Recovery of lithium and cobalt from spent lithium ion batteries (LIBs) using organic acids as leaching reagents: A review. Resour. Conserv. Recycl. 136, 418-435. https://doi.org/10.1016/j.resconrec.2018.04.024

Hanisch, C., Loellhoeffel, T., Diekmann, J., Markley, K. J., Haselrieder, W., Kwade, A., 2015. Recycling of lithium-ion batteries: a novel method to separate coating and foil of electrodes. J. Clean. Prod. 108, 301-311. https://doi.org/10.1016/j.jclepro.2015.08.026

Huang, B., Pan, Z., Su, X., An, L., 2018. Recycling of lithium-ion batteries: Recent advances and perspectives. J. Power Sources 399, 274-286. https://doi.org/10.1016/j.jpowsour.2018.07.116

Ingier-Stocka, E., Grabowska, A., 1998. Thermal Analysis of Cobalt(II) Salts with Some Carboxylic Acids. J. Therm. Anal. calorim. https://doi.org/10.1023/A:1010116902412

International Union of Pure and Applied Chemistry, 2012. IUPAC-NIST Solubility Database, Version 1.1; NIST Standard Reference Database 106 [WWW Document]. https://doi.org/http://dx.doi.org/10.18434/T4QC79

Janès, A., Chaineaux, J., 2013. Experimental determination of flash points of flammable liquid aqueous solutions. Chem. Eng. Trans. 31, 943-948. doi:10.3303/CET1331158

Lv, W., Wang, Z., Cao, H., Sun, Y., Zhang, Y., Sun, Z., 2018. A Critical Review and Analysis on the Recycling of Spent Lithium-Ion Batteries. ACS Sustain. Chem. Eng. 6, 1504-1521. https://doi.org/10.1021/acssuschemeng.7b03811

Melin, H. E., 2018. The lithium-ion battery end-of-life market—A baseline study, Global Battery Alliance, World Economic Forum.

Meshram, P., Pandey, B. D., Mankhand, T. R., 2015a. Hydrometallurgical processing of spent lithium ion batteries (LIBs) in the presence of a reducing agent with emphasis on kinetics of leaching. Chem. Eng. J. 281, 418-427. https://doi.org/10.1016/j.cej.2015.06.071

Meshram, P., Pandey, B. D., Mankhand, T. R., 2015b. Recovery of valuable metals from cathodic active material of spent lithium ion batteries: Leaching and kinetic aspects. Waste Manag. 45, 306-313. https://doi.org/10.1016/j.wasman.2015.05.027

Nayl, A. A., Hamed, M. M., Rizk, S. E., 2015. Selective extraction and separation of metal values from leach liquor of mixed spent Li-ion batteries. J. Taiwan Inst. Chem. Eng. 55, 119-125. https://doi.org/10.1016/j.jtice.2015.04.006

Qusti, A., Samarkandy, A., Al-Thabaiti, S., Diefallah, E.-H., 1997. The kinetics of thermal decomposition of nickel formate dihydrate in air. J. King Abdulaziz Univ. 9, 73-81. doi:10.4197/Sci.9-1.7

Sonoc, A., Jeswiet, J., Soo, V. K., 2015. Opportunities to Improve Recycling of Automotive Lithium Ion Batteries. Procedia CIRP 29, 752-757. https://doi.org/10.1016/j.procir.2015.02.039

Tsiropinas, F., 1917. A Volumetric Method for the Determination of Formic Acid or Formates in the Presence of Hydroxides, Carbonates, Oxalates and Acetates. J. Ind. Eng. Chem. 9, 1110-1111. https://doi.org/10.1021/ie50096a018

Zhang, P., Yokoyama, T., Itabashi, O., Suzuki, T. M., Inoue, K., 1998. Hydrometallurgical process for recovery of metal values from spent lithium-ion secondary batteries. Hydrometallurgy 47, 259-271. https://doi.org/10.1016/50304-386X(97)00050-9

Zheng, X., Zhu, Z., Lin, X., Zhang, Y., He, Y., Cao, H., Sun, Z., 2018a. Green Industrial Processes—Review A Mini-Review on Metal Recycling from Spent Lithium Ion Batteries 4, 361-370. https://doi.org/10.1016/j.eng.2018.05.018

Zheng, Y., Song, W., Mo, W., Zhou, L., Liu, J.-W., 2018b. Lithium fluoride recovery from cathode material of spent lithium-ion battery. RSC Adv. 8, 8990-8998. https://doi.org/10.1039/C8RA00061A

The invention claimed is:

1. A method for recovering one or more metals from a metal-containing material, comprising:
   leaching the metal-containing material with a formic acid solution;
   obtaining a slurry comprising the one or more metals as one or more metal formates;
   subjecting the slurry to one or more solid/liquid separation steps to obtain the one or more metal formates as one or more metal formate salts and a leachate solution;
   reacting the one or more metal formate salts with sulphuric acid to produce sulphates of the one or more metals and formic acid; and
   crystallizing the sulphates of the one or more metals to obtain sulphate salts of the one or more metals.

2. The method of claim 1, wherein the metal-containing material comprises a battery electrode.

3. The method of claim 1, wherein the metal-containing material comprises a lithium-ion battery cathode.

4. The method of claim 1, wherein the metal-containing material comprises lithium-ion battery cathode active material comprising at least one of NCM, LCO, NCA, MO, and NMO.

5. The method of claim 1, wherein the metal-containing material comprises lithium-ion battery cathode active material comprising NCM.

6. The method of claim 1, wherein the metal containing material comprises lithium-ion battery cathode active material comprising NCM111.

7. The method of claim 1, wherein:
   the one or more metal formate salts comprise one or more of Ni formate salt, Co formate salt, and Mn formate salt; and
   the leachate solution comprises dissolved Li formate.

8. The method of claim 1, wherein the formic acid solution has a concentration up to about 80% v/v.

9. The method of claim 1, wherein the leaching is done at a pressure up to about 45 bar and at a temperature up to about 270° C.

10. A method for recovering Li and one or more of Ni, Co, and Mn from a lithium-ion battery cathode active material, comprising:
   leaching the cathode active material with a formic acid solution;
   obtaining one or more of Ni formate salt, Co formate salt, and Mn formate salt and
   obtaining a solution comprising Li formate;
   using one or more solid/liquid separation steps to separate the one or more of Ni formate salt, Co formate salt, and Mn formate salt from the solution comprising Li formate;
   dewatering the solution comprising Li formate to produce one or more Li salts;

subjecting the one or more Li salts to thermal decomposition at a temperature of about 270 to about 450° C.;

wherein Li carbonate is obtained; and reacting the one or more of Ni formate salt, Co formate salt, and Mn formate salt with sulphuric acid to produce one or more of Ni sulphate, Co sulphate, and Mn sulphate and formic acid;

crystallizing the one or more of Ni sulphate, Co sulphate, and Mn sulphate to produce one or more of Ni sulphate salt, Co sulphate salt, and Mn sulphate salt.

11. The method of claim 10, comprising filtering the solution comprising Li formate, adding Li carbonate to precipitate one or more of residual Ni formate, Co formate, and Mn formate, and then filtering prior to the dewatering.

12. The method of claim 10, wherein the lithium-ion battery cathode active material is present in a starting material prepared from a lithium-ion battery that has been subjected to physical degradation selected from at least one of shredding, grinding, and pulverizing.

13. The method of claim 10, wherein the one or more of Ni sulphate salt, Co sulphate salt, and Mn sulphate salt are subjected to filtration and/or recrystallization to remove low solubility contaminants.

14. The method of claim 10, comprising one or more of recovering carbon dioxide produced during the leaching, recovering water and/or formic acid produced during the crystallization, and recovering carbon dioxide and/or water and/or heat produced during the thermal decomposition.

15. The method of claim 14, comprising using the recovered carbon dioxide to create an atmosphere suitable for disassembling a lithium-ion battery without adverse reaction.

16. The method of claim 1, comprising drying the sulphate salts of the one or more metals.

17. The method of claim 16, comprising recovering water and the formic acid produced during the drying.

18. The method of claim 7, wherein one or more solid/liquid separation steps are used after the leaching to produce the solution comprising Li formate.

* * * * *